United States Patent
Gondo et al.

(10) Patent No.: US 9,599,738 B2
(45) Date of Patent: Mar. 21, 2017

(54) TOOL POSITION DETECTION DEVICE, BENDING DEVICE, TOOL, POSITION DETECTION METHOD OF ATTACHMENT MEMBER WITH RESPECT TO ATTACHMENT TARGET DEVICE

(71) Applicant: AMADA COMPANY, LIMITED, Kanagawa-ken (JP)

(72) Inventors: Masahiko Gondo, Kanagawa (JP); Aristophane Goudjanou, Kanagawa (JP); Kazuhiro Kanno, Kanagawa (JP)

(73) Assignee: AMADA COMPANY, LIMITED, Kanagawa-Ken (JP)

( * ) Notice: Subject to any disclaimer, the term of this patent is extended or adjusted under 35 U.S.C. 154(b) by 203 days.

(21) Appl. No.: 14/407,278

(22) PCT Filed: May 16, 2013

(86) PCT No.: PCT/JP2013/063666
§ 371 (c)(1),
(2) Date: Dec. 11, 2014

(87) PCT Pub. No.: WO2013/190934
PCT Pub. Date: Dec. 27, 2013

(65) Prior Publication Data
US 2015/0160361 A1    Jun. 11, 2015

(30) Foreign Application Priority Data

Jun. 19, 2012   (JP) ................................ 2012-137590
May 10, 2013   (JP) ................................ 2013-099809

(51) Int. Cl.
*G01V 3/00*     (2006.01)
*B21D 5/02*     (2006.01)

(52) U.S. Cl.
CPC ................. *G01V 3/00* (2013.01); *B21D 5/02* (2013.01); *B21D 5/0254* (2013.01)

(58) Field of Classification Search
CPC ............. B21D 5/02; B21D 37/00; G01V 3/00
(Continued)

(56) References Cited

U.S. PATENT DOCUMENTS 4,879,508 A    11/1989   Andermo
7,325,428 B2 *   2/2008   Bruggink ............. B21D 5/0209
                                                  72/15.1
(Continued)

FOREIGN PATENT DOCUMENTS

JP          62-235503       10/1987
JP          2001-219221     8/2001
(Continued)

OTHER PUBLICATIONS

International Search Report for PCT/JP2013/063666 having a mail date of Aug. 20, 2013.

*Primary Examiner* — Jeff Natalini
(74) *Attorney, Agent, or Firm* — Greenblum & Bernstein, P.L.C.

(57) ABSTRACT

A tool attachment unit includes a power feeding electrode and a plurality of detection electrodes. When a tool including a power receiving electrode and a displacement electrode is attached onto the tool attachment unit, the power feeding electrode and the power receiving electrode are opposed to each other, and the detection electrode and the displacement electrode are opposed to each other. A pair of the power feeding electrode and the power receiving electrode and a pair of the detection electrode and the displacement electrode form a capacitor circuit. A capacity of the capacitor circuit is changed in response to a position of the tool. A tool position detection unit supplies a power feeding signal to the power feeding electrode. A voltage information (Continued)

extractor extracts voltage information from the detection electrode. Based on the extracted voltage information, a position detection/arithmetic operation unit detects to which position the tool is attached.

22 Claims, 18 Drawing Sheets

(58) Field of Classification Search
USPC .............................................. 72/462–482.94
See application file for complete search history.

(56) References Cited

U.S. PATENT DOCUMENTS

| 2003/0019272 | A1* | 1/2003 | Harrington | .......... | B21D 5/0236 72/481.1 |
|---|---|---|---|---|---|
| 2005/0268680 | A1 | 12/2005 | Bruggink | | |
| 2006/0008594 | A1* | 1/2006 | Kang | ..................... | B82Y 30/00 427/569 |
| 2006/0139001 | A1* | 6/2006 | Lin | ........................ | H02J 7/0045 320/115 |
| 2008/0135418 | A1* | 6/2008 | Yuan | ........................ | B23H 1/10 205/686 |
| 2009/0248007 | A1* | 10/2009 | Falkenstein | ............ | A61B 90/90 606/33 |
| 2012/0146431 | A1* | 6/2012 | Ichikawa | .................. | H02J 3/00 307/149 |

FOREIGN PATENT DOCUMENTS

| JP | 2005-74446 | 3/2005 |
|---|---|---|
| JP | 2005-334973 | 12/2005 |

* cited by examiner

FIG. 2
(a)
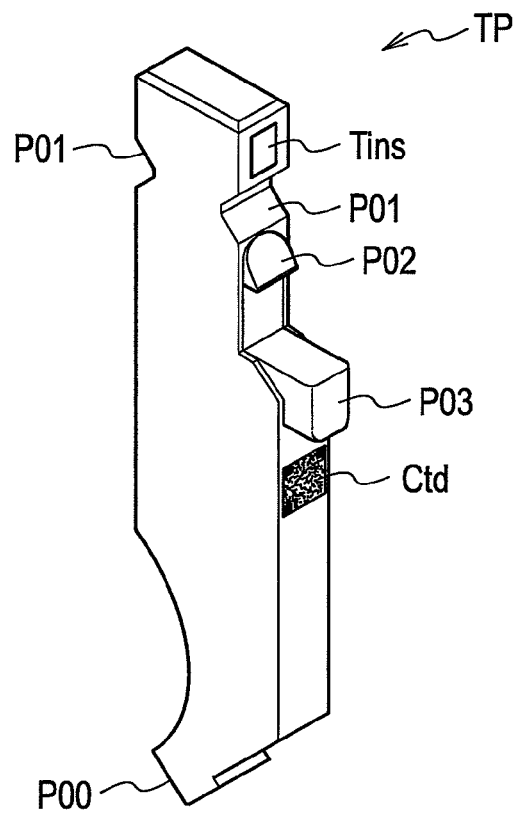
(b)
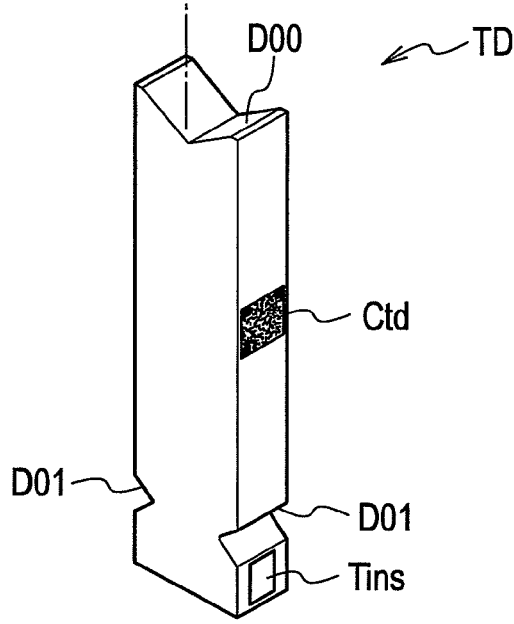

FIG. 9
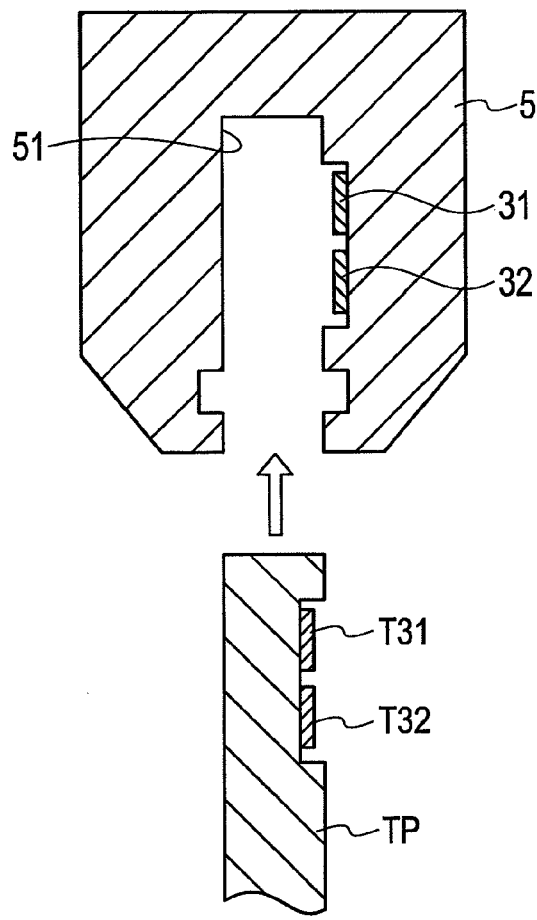
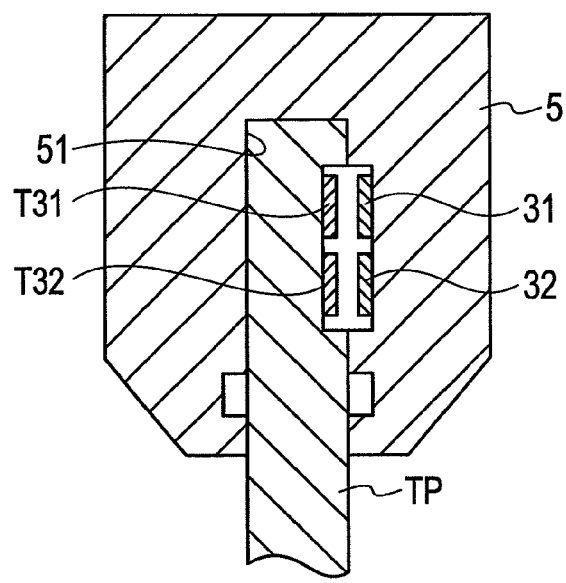

| SHIFT AMOUNT | VOLTAGE VALUE | | TOTAL VOLTAGE | Vmax RATIO |
|---|---|---|---|---|
| | 32a | 32b | | |
| 0 | 2.4 | 0 | 2.4 | 1 |
| L1 | 2.3 | 0.1 | 2.4 | 0.96 |
| L2 | 2.0 | 0.4 | 2.4 | 0.83 |
| L3 | 1.4 | 1.0 | 2.4 | 0.58 |
| L4 | 1.1 | 1.3 | 2.4 | 0.46 |
| L5 | 0.7 | 1.7 | 2.4 | 0.29 |
| ... | ... | ... | 2.4 | ... |
| ... | ... | ... | 2.4 | ... |
| Lx | 0.1 | 2.3 | 2.4 | 0.04 |

| Vmax RATIO | SHIFT AMOUNT |
|---|---|
| 1 | 0 |
| 0.96 | L1 |
| 0.83 | L2 |
| 0.58 | L3 |
| 0.46 | L4 |
| 0.29 | L5 |
| ... | ... |
| ... | ... |
| 0.04 | Lx |

TOOL POSITION DETECTION DEVICE, BENDING DEVICE, TOOL, POSITION DETECTION METHOD OF ATTACHMENT MEMBER WITH RESPECT TO ATTACHMENT TARGET DEVICE

TECHNICAL FIELD

Embodiments relate to a tool position detection device that detects a position of a tool attached onto a tool attachment unit such as a tool holder, to a bending device that bends a metallic plate material by using tools, to a tool for use in the bending device, and to a position detection method of an attachment member with respect to an attachment target device, the position detection method detecting a position of an attachment member (for example, a tool) attached onto an attachment target device (for example, a tool attachment unit).

BACKGROUND ART

There is a bending device that bends a metallic plate material by a punch and a die. The bending device is also referred to as a press brake. The bending device includes: an upper table attached with an upper tool holder; and a lower table attached with a lower tool holder.

In an event of bending the plate material, the punch is attached onto the upper tool holder, the die is attached onto the lower tool holder, and the upper table is lowered in a direction of the lower table, whereby the plate material is sandwiched and bent by the punch and the die. The punch and the die are generically referred to as tools, and the upper tool holder and the lower tool holder are generically referred to as tool holders.

An operator attaches the tool onto the tool holder based on bending setup information. Specifically, the setup information includes: information (selected tool information) indicating which tool should be used among a plurality of the tools; and information (attachment position information) indicating to which position in a longitudinal direction of the tool holder the tool should be attached. The operator attaches the tool, which is indicated by the selected tool information, to a position in a width direction of the tool holder, which is indicated by the attachment position information.

CITATION LIST

Patent Literature

[PTL 1] Japanese Patent Laid-Open Publication No. 2005-334973

SUMMARY OF INVENTION

Technical Problem

Heretofore, to which position of the tool attachment unit (attachment target device) such as the tool holder the tool (attachment member) should be attached depends on operator skill. Hence, it is possible that the operator may mistake the position to which the tool should be attached. Moreover, which tool should be attached onto the tool holder also depends on the operator skill. Hence, it is also possible that the operator may mistake the tool to be attached.

Accordingly, when the tool is attached onto the tool holder in response to the attachment position information, it is desired that the position of the tool attached onto the tool holder be detected accurately. Moreover, in a case where a tool, which is not the tool indicated by the selected tool information, is attached onto the tool holder, it is desired that such an erroneous attachment be detected.

These desires should be dealt with not only in a case where the operator manually selects the tool and attaches the tool onto the tool attachment unit, but also in a case where this attachment operation is automated by using a robot or an exclusive tool changing device (ATC: Automatic Tool Changer).

In order to deal with the desires as described above, it is an object of the embodiments to provide a tool position detection device capable of accurately detecting the position of the tool attached onto the tool attachment unit.

It is an object of the embodiments to provide a bending device capable of preventing the erroneous attachment of the tool, and capable of attaching the tool, which is indicated by the setup information, to a correct position of the tool attachment unit by detecting the position of the tool attached onto the tool attachment unit.

It is an object of the embodiments to provide a tool capable of detecting whether or not to be attached to the correct position of the tool attachment unit by the tool position detection device.

It is an object of the embodiments to provide a position detection method of the attachment member with respect to the attachment target device, the position detection method being capable of detecting an attachment position of an arbitrary attachment member with respect to an arbitrary attachment target device.

Solution to Problem

In accordance with a first aspect, there is provided a tool position detection device comprising: a power feeding electrode provided on an inner wall of a tool attachment unit that attaches thereonto a tool having a power receiving electrode and a displacement electrode, the power feeding electrode being provided to be opposite to the power receiving electrode in a longitudinal direction of the tool attachment unit in a non-contact state; a plurality of detection electrodes, which is provided on the inner wall to be opposite to the displacement electrode in a non-contact state, being insulated from the power feeding electrode, and being provided in line in the longitudinal direction of the tool attachment unit; and a power feeding signal supply unit configured to supply an alternating current power feeding signal to the power feeding electrode, wherein, when the tool is attached onto the tool attachment unit, a pair of the power feeding electrode and the power receiving electrode, which are opposite to each other, and a pair of the detection electrode and the displacement electrode, which are opposite to each other, form a capacitor circuit, a capacity of the capacitor circuit is configured to be changed in response to a position of the tool with respect to the longitudinal direction of the tool attachment unit, and the tool position detection device further comprises: a voltage information extractor configured to extract voltage information from the detection electrode when the power feeding signal is supplied to the power feeding electrode by the power feeing signal supply unit, the voltage information being changed in response to the capacity of the capacitor circuit; and a position detection/arithmetic operation unit configured to detect to which position in the longitudinal direction of the tool attachment unit the tool is attached based on the voltage information extracted by the voltage information extractor.

In the above-described tool position detection device, preferably, the voltage information extractor includes an electrode switching circuit that alternatively selects and sequentially switches detection electrodes, which are taken as extraction targets of the voltage information, from among the plurality of detection electrodes.

In the above-described tool position detection device, preferably, the tool position detection device further comprises: an A/D converter configured to convert the voltage information, which is extracted by the voltage information extractor, into a digital signal, wherein the position detection/arithmetic operation unit detects to which position in the longitudinal direction of the tool attachment unit the tool is attached based on the voltage information converted into the digital signal by the A/D converter.

In the above-described tool position detection device, preferably, the position detection/arithmetic operation unit detects the position of the tool by using two pieces of voltage information extracted from two adjacent detection electrodes among the plurality of detection electrodes by the voltage information extractor.

In the above-described tool position detection device, preferably, the position detection/arithmetic operation unit detects the position of the tool by using a ratio of a maximum value of voltage information extracted by the voltage information extractor in a state where the displacement electrode and the detection electrode are opposite to each other to just coincide with each other, and of the voltage information extracted from the detection electrode by the voltage information extractor.

In the above-described tool position detection device, preferably, the tool position detection device further comprises: a characteristic information holder configured to hold characteristic information indicated by the voltage information extracted by the voltage information extractor, wherein the position detection/arithmetic operation unit detects the position of the tool by using the characteristic information held by the characteristic information holder.

In the above-described tool position detection device, preferably, a width of the displacement electrode is one fixed width irrespective of a width of the tool, and a width of the detection electrode is approximately a same width as the width of the displacement electrode.

In the above-described tool position detection device, preferably, the detection electrodes are provided by a maximum attachable number when the narrowest tools are attached onto the tool attachment unit.

In the above-described tool position detection device, preferably, the power feeding electrode and the detection electrodes are individually covered with insulating films.

In accordance with a second aspect, there is provided a bending device that bends a plate material by using a punch and a die, comprising: a first tool attachment unit that includes a first recessed portion housing an end portion of the punch therein, and configured to attach the punch thereonto; and a second tool attachment unit that includes a second recessed portion housing an end portion of the die therein, and configured to attach the die thereonto, wherein the punch and the die include power receiving electrodes and displacement electrodes, which are provided on the respective end portions thereof, the first and second tool attachment units include: power feeding electrodes, which are provided in a longitudinal direction of sidewalls of the first and second recessed portions, being opposite to the power receiving electrodes in a non-contact state when the punch and the die are attached onto the first and second tool attachment units, respectively; and a plurality of detection electrodes, which is provided in line in the longitudinal direction of the sidewalls of the first and second recessed portions in a state of being insulated from the power feeding electrodes, being opposite to the displacement electrodes in a non-contact state when the punch and the die are attached onto the first and second tool attachment units, respectively, when the punch or the die is attached onto the first or second recessed portion, a pair of the power feeding electrode and the power receiving electrode, which are opposite to each other, and a pair of the detection electrode and the displacement electrode, which are opposite to each other, form a capacitor circuit, a capacity of the capacitor circuit is configured to be changed in response to a position of the punch or the die with respect to the longitudinal direction of the first or second recessed portion, and the bending device further comprises: a power feeding signal supply unit configured to supply the power feeding signal to the power feeding electrode; a voltage information extractor configured to extract voltage information from each of the detection electrodes when the power feeding signal is supplied to the power feeding electrode by the power feeing signal supply unit, the voltage information being changed in response to the capacity of the capacitor circuit; and a position detection/arithmetic operation unit configured to detect to which position in the longitudinal direction of the first or second recessed portion the punch or the die is attached based on the voltage information extracted by the voltage information extractor, the voltage information coming from each of the plurality of detection electrodes.

In accordance with the above-described bending device, preferably, the punch and the die include pieces of identification information, which individually specify the punch and the die, and the bending device further comprises a reader that reads the pieces of the identification information.

In accordance with the above-described bending device, preferably, each piece of the identification information is formed of a two-dimensional code, and the reader is a two-dimensional code reader configured to read the two-dimensional code.

In accordance with the above-described bending device, preferably, the bending device further comprises: an NC unit configured to collate the punch or the die, which is specified by the identification information read by the reader, and a punch or a die, which is instructed by setup information indicating a setup of bending the plate material, with each other, and determine whether or not the punch or the die, which is instructed by the setup information, is attached onto the first or second tool attachment unit.

In accordance with the above-described bending device, preferably, the NC unit collates a position of the punch or the die, the position being detected by the position detection/arithmetic operation unit, and a position to which the punch or the die should be attached, the position being instructed by the setup information, with each other, and determines whether or not the punch or the die is attached to the position instructed by the setup information in the first or second tool attachment unit.

In accordance with the above-described bending device, preferably, each of the power receiving electrodes and each of the displacement electrodes have one fixed width irrespective of a width of the punch and the die, and are formed on centers in a width direction of the punch and the die.

In accordance with the above-described bending device, preferably, a width of each of the detection electrodes is approximately a same width as the width of the displacement electrode.

In accordance with the above-described bending device, preferably, the power receiving electrodes and the displacement electrodes and the power feeding electrodes and the detection electrodes are individually covered with insulating films.

In accordance with the above-described bending device, preferably, the first and second tool attachment units are tool holders individually attached onto an upper table and a lower table, or an adapter plate attached onto the upper table.

In accordance with a third aspect, there is provided a tool, which is attached onto a tool attachment unit of a bending device and bends a plate material, comprising: a power receiving electrode, which, when the tool is attached onto the tool attachment unit, is provided in a longitudinal direction of an inner wall of the tool attachment unit, and is opposite to a power feeding electrode in a non-contact state, the power feeding electrode being supplied with an alternating current power feeding signal; and a displacement electrode, which, when the tool is attached onto the tool attachment unit, is opposite to any of a plurality of detection electrodes in a state of being insulated from the power feeding electrode, the detection electrodes being provided in line in the longitudinal direction of the inner wall.

In the above-described tool, preferably, when the tool is attached onto the tool attachment unit, a pair of the power feeding electrode and the power receiving electrode, which are opposite to each other, and a pair of the detection electrode and the displacement electrode, which are opposite to each other, form a capacitor circuit, and a capacity of the capacitor circuit is configured to be changed in response to a position of the tool with respect to a longitudinal direction of the tool attachment unit.

In the above-described tool, preferably, a width of the displacement electrode is one fixed width irrespective of a width of the tool, and is approximately a same width as a width of the detection electrode.

In the above-described tool, preferably, the tool includes identification information that specifies the tool.

In the above-described tool, preferably, the identification information is formed of a two-dimensional code.

In the above-described tool, preferably, the power receiving electrode and the displacement electrode are covered with an insulating film.

In the above-described tool, preferably, the power receiving electrode and the displacement electrode are provided on both of the front and back surfaces of the tool.

In the above-described tool, preferably, the identification information is provided on both of the front and back surfaces of the tool.

In accordance with a fourth aspect, there is provided a position detection method of an attachment member with respect to an attachment target device, the position detection method comprising: when an attachment member having a power receiving electrode and a displacement electrode is attached to any position in a longitudinal direction of an attachment target device, opposing the power receiving electrode to a power feeding electrode in a non-contact state, the power feeding electrode being provided in the longitudinal direction of the attachment target device, and opposing the displacement electrode to any of a plurality of detection electrodes in a non-contact state, the detection electrodes being provided in line in the longitudinal direction of the attachment target device and being insulated from the power feeding electrode; forming a capacitor circuit in which a capacity is changed in response to a position of the attachment member with respect to the longitudinal direction of the attachment target device, the capacitor circuit being formed of a pair of the power feeding electrode and the power receiving electrode, which are opposite to each other, and a pair of the detection electrode and the displacement electrode, which are opposite to each other; supplying an alternating current power feeding signal to the power feeding electrode; extracting voltage information from the detection electrode in a state where the power feeding signal is supplied to the power feeding electrode, the voltage information being changed in response to the capacity of the capacitor circuit; and detecting to which position in the longitudinal direction of the attachment target device the attachment member is attached based on a position of the detection electrode from which the voltage information is extracted among the plurality of detection electrodes.

In the above-described position detection method of an attachment member with respect to an attachment target device, preferably, the position of the attachment member is detected by using two pieces of voltage information extracted from two adjacent detection electrodes among the plurality of detection electrodes.

In the above-described position detection method of an attachment member with respect to an attachment target device, preferably, the position of the attachment member is detected by using a ratio of a maximum value of voltage information extracted from the detection electrode in a state where the displacement electrode and the detection electrode are opposite to each other to just coincide with each other, and of the voltage information extracted from the detection electrode.

In the above-described position detection method of an attachment member with respect to an attachment target device, preferably, characteristics indicated by the voltage information changed depending on a relative positional relationship between the displacement electrode and the detection electrode are measured as characteristic information in advance, and the position of the tool is detected by using the characteristic information.

Advantageous Effects of the Invention

In accordance with the tool position detection device of the embodiments, the position of the tool attached onto the tool attachment unit can be detected accurately.

In accordance with the bending device of the embodiments, the erroneous attachment of the tool can be prevented, and the tool indicated by the setup information can be attached to the correct position of the tool attachment unit by detecting the position of the tool attached onto the tool attachment unit.

In accordance with the tool of the embodiments, whether or not the tool is attached to the correct position of the tool attachment unit can be detected by the tool position detection device.

In accordance with the position detection method of the attachment member with respect to the attachment target device, an attachment position of an arbitrary attachment member with respect to an arbitrary attachment target device can be detected.

BRIEF DESCRIPTION OF DRAWINGS

FIG. 2 is a perspective view showing an example of a punch and a die.

FIG. 9 is a partial cross-sectional view showing states before and after attaching the punch onto the upper tool holder.

DESCRIPTION OF EMBODIMENTS

A description is made below of respective embodiments of a tool position detection device, a bending device, a tool, and a position detection method of an attachment member with respect to an attachment target device with reference to the accompanying drawings.

<First Embodiment of Bending Device>

A bending device 100 of a first embodiment shown in FIG. 1 mounts a tool position detection device of an embodiment thereon as will be described later in detail. The one embodiment of the tool is described in combination with the description of the bending device 100 of the first embodiment.

Figure 1:
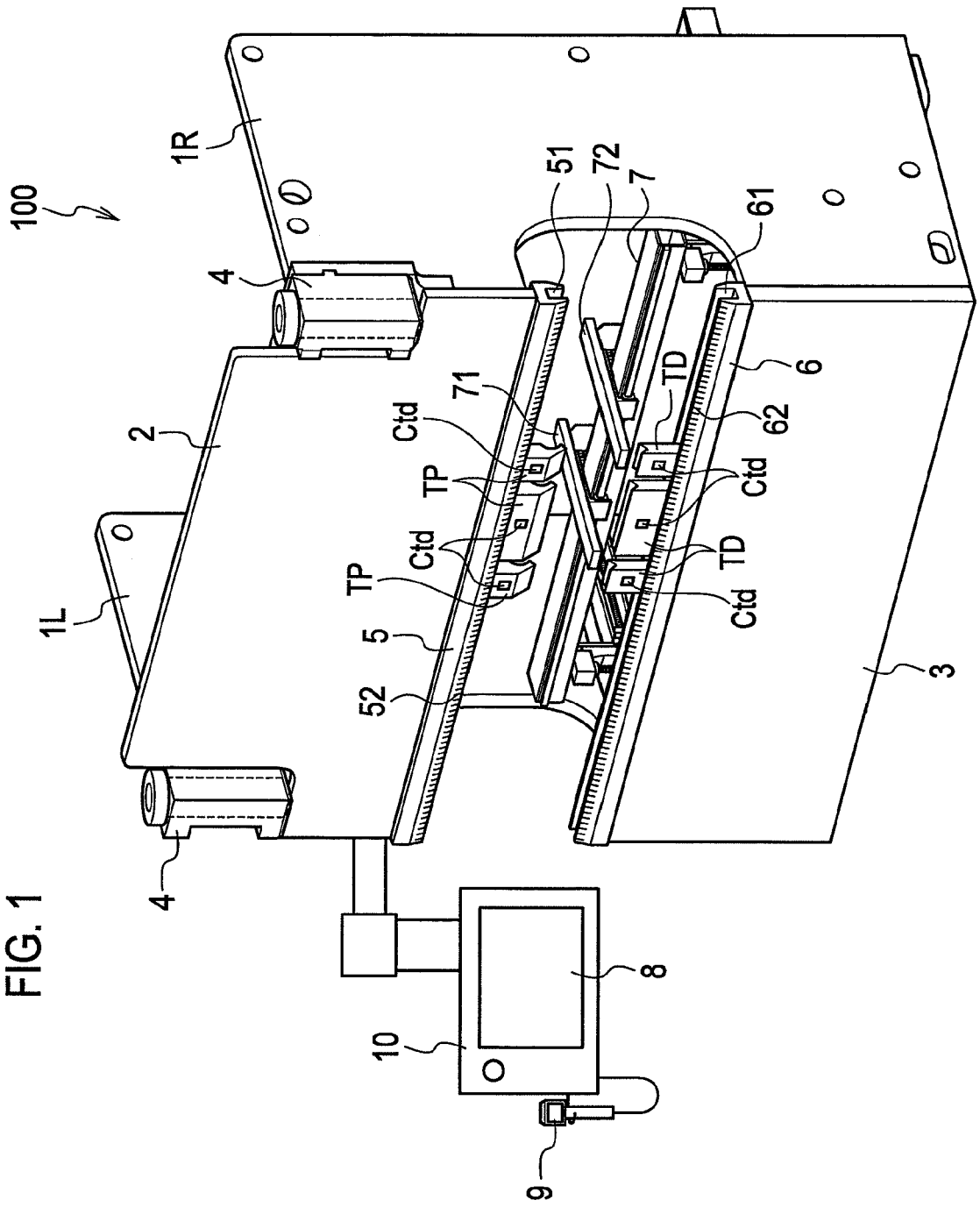
FIG. 1 is a perspective view showing a first embodiment of a bending device.

In FIG. 1, an upper table 2 and a lower table 3 are attached onto left and right side frames 1L and 1R. The upper table 2 is configured to move up and down by hydraulic cylinders 4 provided right and left. The upper table 2 defines a position, which is shown in FIG. 1, as a position of an upper end thereof, and moves in a direction of the lower table 3. Instead of moving the upper table 2 up and down, the lower table 3 may be moved up and down.

Onto a lower end portion of the upper table 2, an upper tool holder 5 for attaching punches TP is attached. Onto such an upper end portion of the lower table 3, a lower tool holder 6 for attaching dies TD is attached. The upper tool holder 5 and the lower tool holder 6 are an example of a tool attachment unit that attaches the punches TP or the dies TD thereonto.

On the upper tool holder 5, a groove-like recessed portion 51, which houses end portions as parts of the punches TP, is formed along a longitudinal direction of the upper tool holder 5. On the upper tool holder 5, a scale 52 is formed along the longitudinal direction of the upper tool holder 5. An operator can take the scale 52 as an index as to which position in the longitudinal direction of the upper tool holder 5 the punches TP should be attached at.

On the lower tool holder 6, a groove-like recessed portion 61, which houses end portions as parts of the dies TD, is formed along a longitudinal direction of the lower tool holder 6. On the lower tool holder 6, a scale 62 is formed along the longitudinal direction of the lower tool holder 6. The operator can take the scale 62 as an index as to which position in the longitudinal direction of the lower tool holder 6 the dies TD should be attached at.

For example, the scales 52 and 62 take, as 0, centers in the longitudinal direction of the upper tool holder 5 and the lower tool holder 6, define a right direction thereof when viewed from the front as a distance in a positive (+) direction, and define a left direction thereof when viewed from the front as a distance in a negative (−) direction. The upper tool holder 5 and the lower tool holder 6 may take left-side end portions thereof as 0.

On a depth side of the upper table 2 and the lower table 3, a back gauge 7 for allowing a plate material to abut thereagainst in an event of bending the plate material is provided. The back gauge 7 includes abutment members 71 and 72 attached in a direction perpendicular to the longitudinal direction of the upper table 2 and the lower table 3.

The back gauge 7 is freely movable in directions approaching and leaving the upper table 2 and the lower table 3. The abutment members 71 and 72 are freely movable in the longitudinal direction of the upper table 2 and the lower table 3. The back gauge 7 is moved by an NC unit 10, which will be described later, so that the plate material can abut against the abutment members 71 and 72 in the event of bending the plate material.

The back gauge 7 is also used for positioning the punches TP and the dies TD with respect to the longitudinal direction of the upper table 2 and the lower table 3 in an event of attaching the punches TP onto the upper tool holder 5 and attaching the dies TD onto the lower tool holder 6. That is to say, the back gauge 7, which is the abutment member for the plate material, is also used as a positioning mechanism for the punches TP and the dies TD. The back gauge 7 is an example of the positioning mechanism for the punches TP and the dies TD.

FIG. 1 shows an example where three punches TP and three dies TD are attached onto both of the upper tool holder 5 and the lower tool holder 6 so as to be opposite to each other. The punches TP and the dies TD include a plurality of types different in width and shape, and types of the punches TP and the dies TD, which correspond to a length and processing method of a bent portion of the plate material to be bent, are selected and used.

Moreover, each number of the punches TP and the dies TD, which are attached onto the upper tool holder 5 and the lower tool holder 6, and positions of the punches TP and the dies TD with respect to the longitudinal direction of the upper tool holder 5 and the lower tool holder 6 are set as appropriate in response to the plate material to be bent and to the processing method.

The bending device 100 includes the NC unit 10 that controls a whole of the bending device 100. The NC unit 10 includes an operation/display panel 8 for displaying a variety of information and operating the bending device 100. The operation/display panel 8 includes a touch panel, and the operator is enabled to perform a variety of operation inputs by the touch panel. For example, by a network, the NC unit 10 is connected to a variety of databases installed at a place remote from a place where the bending device 100 is installed.

By using FIG. 2, a description is made of specific configurations of the punches TP and the dies TD. The punches TP and the dies TD are the one embodiment of the tool. In FIG. 2, one of the plural types of shapes is taken as an example, and the punch TP or the die TD, each width of which is the narrowest, is shown.

As shown in (a) of FIG. 2, a tip end P00 of the punch TP is formed into a shape sharpened at a predetermined angle. On the punch TP, V-like recessed portions P01 are formed in a vicinity of an end portion on a side thereof attached onto the upper tool holder 5. The recessed portions P01 are formed on two opposite surfaces.

When one of the two opposite surfaces is defined as a front surface, and other thereof is defined as a back surface, then the recessed portions P01 are formed on both of the front surface and the back surface. This is because there are: a case of attaching the punch TP onto the upper tool holder 5 while facing a front surface of the punch TP to a front side of FIG. 1; and a case of attaching the punch TP onto the upper tool holder 5 while facing a back surface of the punch TP to the front side of FIG. 1.

The punch TP includes: an anti-drop pin P for preventing a drop of the punch TP at a time of attaching the punch TP onto the upper tool holder 5; and an operation portion P03 for retracting the anti-drop pin P02. The side on which the anti-drop pin P02 is provided is defined as the front surface.

The anti-drop pin P02 and the operation portion P03 are always urged in a direction of protruding from the punch TP. An end portion in the punch TP can be engaged with the recessed portion 51 of the upper tool holder 5, and the anti-drop pin P02 can be engaged with a groove provided across an overall length in the longitudinal direction of the recessed portion 51 of the upper tool holder 5. In this state, the punch TP can be moved in the longitudinal direction along the recessed portion 51.

When the punch TP is attached onto the upper tool holder 5, a clamper provided in the upper tool holder 5 is engaged with the recessed portion P01, and the punch TP is fixed to the upper tool holder 5.

In a state where the engagement of the clamper and the recessed portion P01 is released, the operation portion P03 is pressed and moved against urging force, and an engagement state of the anti-drop pin P02 and the recessed portion 51 can be released. Then, the punch TP can be detached from the recessed portion 51, and can be changed to another punch TP.

In the punch TP, on the end portion on the side thereof attached onto the upper tool holder 5, electrodes, which will be described later, are formed, and insulating films Tins cover the electrodes. The electrodes and the insulating films Tins are formed on both of the front and back surfaces of the punch TP.

The punch TP has two-dimensional codes Ctd as an example of identification information for identifying each punch TP. The two-dimensional codes Ctd are formed on the punch TP, for example, by laser marking. The two-dimensional codes Ctd are also formed on the front and back surfaces of the punch TP.

With regard to the identification information provided on the punch TP, one piece of the identification information may be assigned to each of the punches TP so that all pieces of the identification information can be different even when the type of the punches TP are the same. Alternatively, one piece of the identification information may be assigned for each type of the punches TP. If one piece of the identification information is assigned to each of the punches TP, then it becomes possible to manage a use period of each of the punches TP.

As shown in (b) of FIG. 2, a tip end D00 of the die TD is formed as a V-like recessed portion in response to the shape of the tip end P00 of the punch TP. On the die TD, recessed portions D01 are formed in a vicinity of an end portion on a side thereof attached onto the lower tool holder 6. The recessed portions D01 are also formed on two opposite surfaces.

When the die TD is attached onto the lower tool holder 6, a clamper provided in the lower tool holder 6 is engaged with the recessed portion D01, and the die TD is fixed to the lower tool holder 6.

In the die TD, on the end portion on the side thereof attached onto the lower tool holder 6, electrodes, which will be described later, are formed, and insulating films Tins cover the electrodes. The electrodes and the insulating films Tins are formed on both of the front and back surfaces of the die TD.

The die TD has two-dimensional codes Ctd as an example of identification information for identifying each die TD. In a similar way, the two-dimensional codes Ctd are formed on both of the front and back surfaces of the die TD, for example, by the laser marking.

With regard to the identification information provided on the die TD, one piece of the identification information may be assigned to each of the dies TD so that all pieces of the identification information can be different even when the type of the die TD are the same. Alternatively, one piece of the identification information may be assigned for each type of dies TD. If one piece of the identification information is assigned to each of the dies TD, then it becomes possible to manage a use period of each of the dies TD.

Returning to FIG. 1, the bending device 100 includes a two-dimensional code reader 9 for reading the two-dimensional codes Ctd. The two-dimensional code reader 9 is connected to the NC unit 10. For example, by the two-dimensional code reader 9, the operator or a robot (including an ATC) reads the two-dimensional codes Ctd formed on the punches TP and the dies TD, and thereafter, attaches each of the punches TP or each of the dies TD onto the upper tool holder 5 or the lower tool holder 6.

As shown in FIG. 1, preferably, the two-dimensional codes Ctd are formed at positions, which are not hidden behind the upper tool holder 5 and the lower tool holder 6 in a state where the punches TP and the dies TD are attached onto the upper tool holder 5 and the lower tool holder 6. Even when the punches TP or the dies TD are attached onto the upper tool holder 5 or the lower tool holder 6 without reading the two-dimensional codes Ctd, it is possible to read the two-dimensional codes Ctd in a state where the punches TP or the dies TD are attached thereonto.

It is also conceivable to provide configurations of reading the two-dimensional codes Ctd in the upper tool holder 5 and the lower tool holder 6; however, it is difficult to provide such configurations, which are equivalent to the two-dimensional code reader 9, at all positions onto which it is possible that the punches TP and the dies TD. It is preferable to provide the configurations of reading the two-dimensional codes Ctd on an outside of the upper tool holder 5 and the lower tool holder 6.

Moreover, it is also conceivable to provide configurations of attaching ICs (integrated circuits), in which tool information is stored, in place of the two-dimensional codes Ctd, onto the punches TP and the dies TD, and then reading the ICs, in the upper tool holder 5 and the lower tool holder 6. However, considerable impacts are applied to portions of the punches TP and the dies TD, which are housed in the recessed portions 51 and 61 of the upper tool holder 5 and the lower tool holder 6.

Hence, it is not preferable to provide such precise configurations as the ICs on the end portions of the punches TP and the dies TD, which are housed in the recessed portions 51 and 61.

Also from such a point of view, it is preferable to provide the identification information, which is, for example, the two-dimensional codes Ctd for identifying the punches TP and the dies TD, on such portions protruding from the upper tool holder 5 and the lower tool holder 6, which are not the end portions housed in the recessed portions 51 and 61. Moreover, for the sake of configurational simplification, it is preferable to provide the configurations of reading the identification information on the outside of the upper tool holder 5 and the lower tool holder 6.

Figure 3:
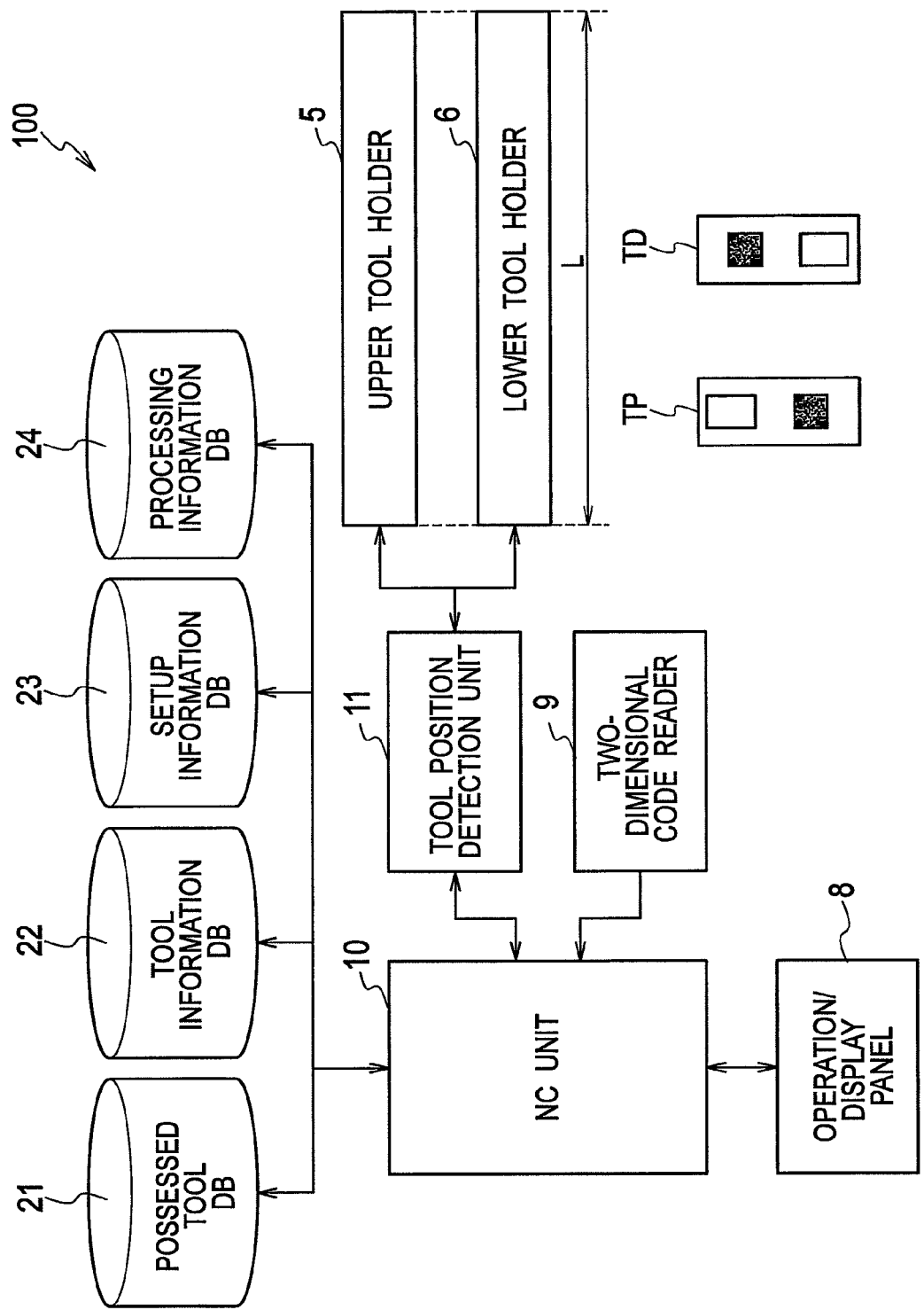
FIG. 3 is a block diagram showing a system configuration of the bending device of the first embodiment.

By using FIG. 3, a description is made of an entire system configuration of the bending device 100. In FIG. 3, the NC unit 10 controls the entirety of the bending device 100. The NC unit 10 displays a variety of information such as setup information, which will be described later, on the operation/display panel 8. The NC unit 10 controls the bending device 100 to perform operations corresponding to an operation input to the operation/display panel 8, which is made by the operator. The information of the two-dimensional codes Ctd of the punches TP or the dies TD, which is read by the two-dimensional code reader 9, is inputted to the NC unit 10.

A tool position detection unit 11 is connected to the NC unit 10. As will be described later, the tool position detection unit 11 detects positions of the punches TP attached onto the upper tool holder 5 and positions of the dies TD attached onto the lower tool holder 6. The positions of the punches TP and the dies TD are attachment positions thereof in the longitudinal direction with respect to a length L in the longitudinal direction of the upper tool holder 5 and the lower tool holder 6. Position information of the punches TP and the dies TD, which is detected by the tool position detection unit 11, is inputted to the NC unit 10.

To the NC unit 10, there are connected a possessed tool database (hereinafter, possessed tool DB) 21, a tool information database (hereinafter, tool information DB) 22, a setup information database (hereinafter, setup information DB) 23, and a processing information database (hereinafter, processing information DB) 24. As mentioned above, these possessed tool DB 21, tool information DB 22, setup information DB 23 and processing information DB 24 are connected to the NC unit 10 by the network.

The possessed tool DB 21 stores the information of the punches TP and the dies TD, which are possessed by the bending device 100. Note that the punches TP and the dies TD are housed in a rack device as a separate body from the bending device 100 shown in FIG. 1, and the punch TP and the die TD, which are required for each bending processing, are taken out from the rack device, and are attached onto the upper tool holder 5 and the lower tool holder 6.

Hence, the punches TP and the dies TD, which are possessed by the bending device 100, stand for such punches TP and such dies TD, which are housed in the rack device and are occasionally used by the bending device 100.

The tool information DB 22 stores information indicating what type of tool each of the punches TP and the die TD is. The tool information is widths of the punches TP and the dies TD, lengths of the punches TP and the dies TD, angles of the tip ends P00 and D00 and the like.

The setup information DB 23 stores setup information at least including: selected tool information indicating which punch TP and die TD should be used in an event of bending the plate material in a predetermined way; and attachment position information indicating onto which positions with respect to the longitudinal direction of the upper tool holder 5 and the lower tool holder 6 the punch TP and the die TD, which are for use, should be attached. The processing information DB 24 stores information indicating what type of processing should be performed.

In FIG. 3, when the punch TP is attached onto the upper tool holder 5, or the die TD is attached onto the lower tool holder 6, the tool position detection unit 11 detects the position of the punch TP or the die TD. By using FIG. 4 to FIG. 17, a description is made of a position detection method of the punch TP or the die TD.

Figure 4:
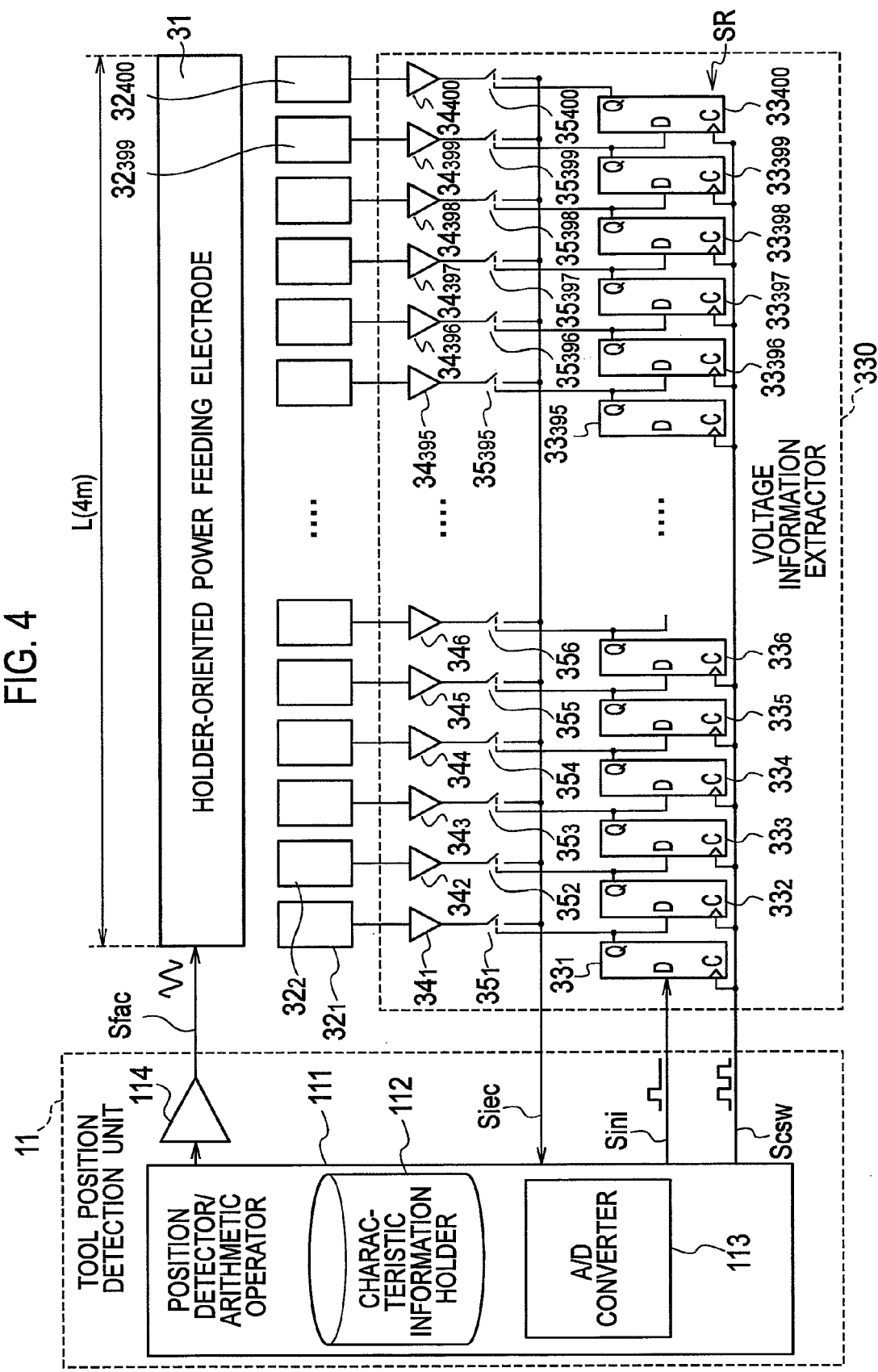
FIG. 4 is a block diagram showing one embodiment of a tool position detection device.

As shown in FIG. 4, the tool position detection unit 11 includes: a position detector/arithmetic operator 111; and an amplifier 114. The position detector/arithmetic operator 111 includes: a characteristic information holder 112; and an A/D converter 113. Here, the position detector/arithmetic operator 111 builds the characteristic information holder 112 and the A/D converter 113 therein; however, the characteristic information holder 112 and the A/D converter 113 may be provided on an outside of the position detector/arithmetic operator 111. The position detector/arithmetic operator 111 can be composed of a microcomputer.

By using FIG. 4, a description is made of configurations, which the upper tool holder 5 and the lower tool holder 6 include. The upper tool holder 5 and the lower tool holder 6 include a holder-oriented power feeding electrode 31 shown in FIG. 4. The holder-oriented power feeding electrode 31 has the same length as the length L of the longitudinal direction of the upper tool holder 5 and the lower tool holder 6. Moreover, the upper tool holder 5 and the lower tool holder 6 include a plurality of holder-oriented detection electrodes 32, which are shown in FIG. 4, in a vicinity of the holder-oriented power feeding electrode 31.

For example, the length L is 2 to 4 m, and is defined to be 4 m here. When the width of the narrowest punch TP and die TD is 10 mm, then at most 400 pieces of the punch TP are attached onto the upper tool holder 5, and at most 400 pieces of the dies TD are attached onto the lower tool holder 6. Accordingly, in the case where the length L is 4 m, and the width of the narrowest punch TP and die TD is 10 mm, then 400 pieces of the holder-oriented detection electrode 32 are provided.

As described above, preferably, the holder-oriented detection electrodes 32 are provided by the maximum attachable number when the narrowest tools are attached onto the tool attachment unit.

The individual holder-oriented detection electrodes 32 are referred to as holder-oriented detection electrode $32_1$ to $32_{400}$, and are referred to as the holder-oriented detection electrode 32 as they are in a case where any of the holder-oriented detection electrode $32_1$ to $32_{400}$ is not specified.

As shown in FIG. 4, the holder-oriented power feeding electrode 31 and the holder-oriented detection electrodes 32 are spaced apart from each other at a slight distance, and are insulated from each other. Preferably, the holder-oriented power feeding electrode 31 and each of the holder-oriented detection electrodes 32 are covered with an insulating film using, for example, resist, and the holder-oriented power feeding electrode 31 and the holder-oriented detection electrode 32 are insulated from each other.

A voltage information extractor 330 is connected to the holder-oriented detection electrodes 32. The voltage information extractor 330 is configured in the following manner. The voltage information extractor 330 includes a shift register SR composed of D flip-flops $33_1$ to $33_{400}$. The D flip-flops $33_1$ to $33_{400}$ are referred to as D flip-flops 33 in a case where any thereof is not specified.

The voltage information extractor 330 further includes: amplifiers $34_1$ to $34_{400}$, which are individually connected to the holder-oriented detection electrode $32_1$ to $32_{400}$; and switches $35_1$ to $35_{400}$, which are individually connected to the amplifiers $34_1$ to $34_{400}$. The amplifiers $34_1$ to $34_{400}$ are referred to as amplifiers 34 in a case where any thereof is not specified, and the switches $35_1$ to $35_{400}$ are referred to as switches 35 in a case where any thereof is not specified.

In FIG. 4, the position detector/arithmetic operator 111 generates an alternating current waveform signal, and the amplifier 114 amplifies the alternating current waveform signal, and supplies an alternating current power feeding signal Sfac to the holder-oriented power feeding electrode 31. The power feeding signal Sfac may be a sin wave signal or a square wave signal. The tool position detection unit 11 is a power feeding signal supply unit that supplies the alternating current power feeding signal Sfac to the holder-oriented power feeding electrode 31.

The position detector/arithmetic operator 111 supplies a switching control signal Scsw, which is alternately switched between high (H) and low (L), to clock (C) terminals of all of the D flip-flops 33. The position detector/arithmetic operator 111 supplies an initial input signal Sini to a D terminal of the D flip-flop $33_1$ of the voltage information extractor 330. The initial input signal Sini may be a pulse signal with a single H pulse.

When the H switching control signal Scsw and the initial input signal Sini are inputted to the D flip-flop $33_1$, an output of a Q terminal becomes H, and the switch 351 turns ON. Then, voltage information from the holder-oriented detection electrode $32_1$ is amplified by the amplifier $34_1$, and is inputted as a voltage information signal Siec through the switch $35_1$ to the position detector/arithmetic operator 111. A description will be made later of a reason why the voltage information is obtained from the holder-oriented detection electrodes 32.

When the output of the Q terminal of the D flip-flop $33_1$ becomes H, H is inputted to a D terminal of the D flip-flop $33_2$. When the switching control signal Scsw becomes H the next time, an output of a Q terminal of the D flip-flop $33_2$ becomes H in a similar way, and the switch $35_2$ turns ON. Then, voltage information from the holder-oriented detection electrode $32_2$ is amplified by the amplifier $34_2$, and is inputted as the voltage information signal Siec through the switch $35_2$ to the position detector/arithmetic operator 111.

As described above, in the D flip-flops 33 of the shift register SR, the outputs of the Q terminals become H at every clock of the switching control signal Scsw sequentially from the D flip-flop $33_1$ to the D flip-flop $33_{400}$. Since only the switches 35 connected to the D flip-flops 33 in which the outputs of the Q terminals become H turn ON, the switches 35 turn ON sequentially from the switch $35_1$ to the switch $35_{400}$.

Hence, individual pieces of the voltage information from the holder-oriented detection electrode $32_1$ to the holder-oriented detection electrode $32_{400}$ are extracted sequentially, and are inputted as such voltage information signals Siec to the position detector/arithmetic operator 111.

When an output of a Q terminal of the D flip-flop $33_{400}$ becomes H, then the initial input signal Sini is supplied to the D terminal of the D flip-flop $33_1$ one more time, and the same operations are repeated. The initial input signal Sini just needs to be set as a pulse signal that becomes H once a cycle in which the voltage information extractor 330 sequentially switches all of the holder-oriented detection electrodes 32.

The shift register SR operates as an electrode switching circuit that alternatively selects and sequentially switches the holder-oriented detection electrodes 32, which are taken as extraction targets of the voltage information, from among the holder-oriented detection electrodes $32_1$ to $32_{400}$.

The voltage information signal Siec inputted to the position detector/arithmetic operator 111 is converted into a digital signal by the A/D converter 113. The position detector/arithmetic operator 111 detects the positions of the punches TP or the dies TD, which are attached onto the upper tool holder 5 or the lower tool holder 6, based on from which holder-oriented detection electrode 32 the voltage information signal Siec is obtained, and by referring to a value of a voltage at which the voltage information signal Siec is converted into the digital signal. An arithmetic operation method of the position detection will be described later.

Figure 5:
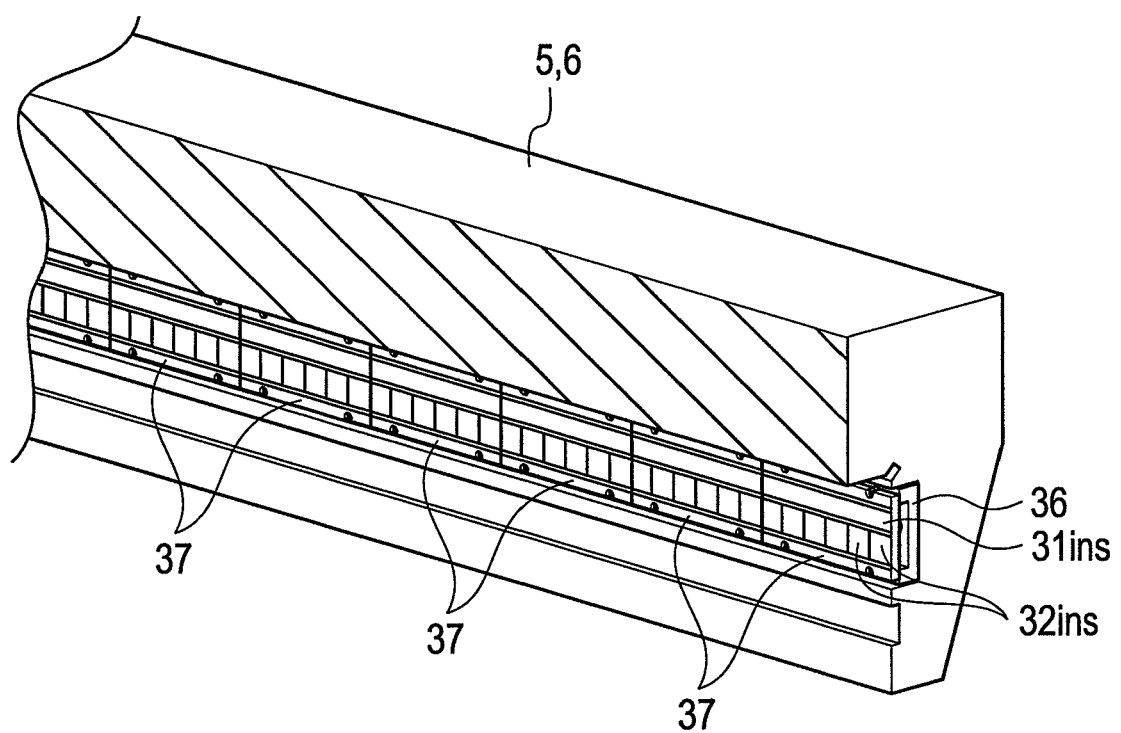
FIG. 5 is a partial perspective view showing, in a cut state, an upper tool holder and a lower tool holder, which compose a part of the bending device and the tool position detection device.
Figure 6:
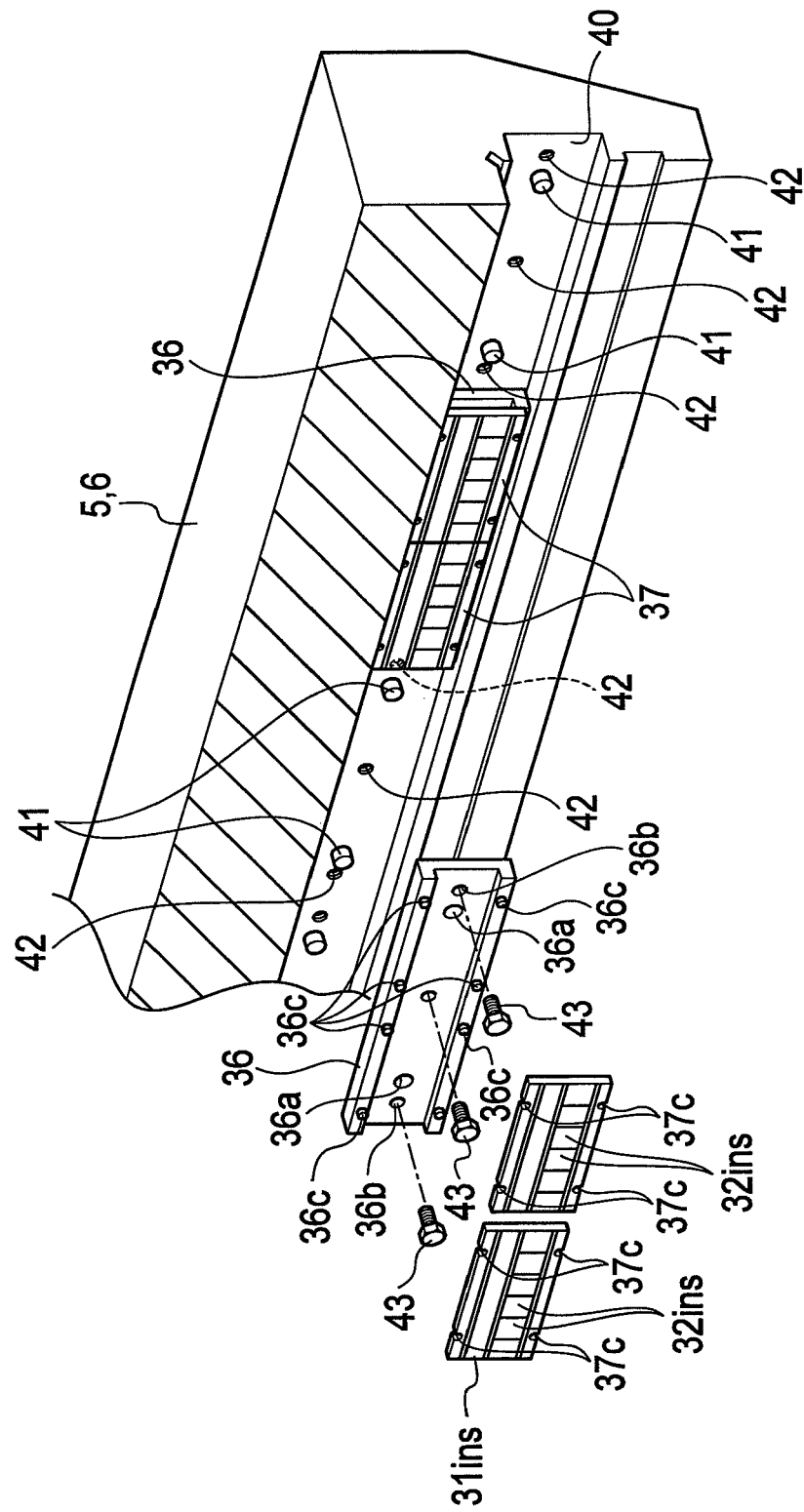
FIG. 6 is an exploded perspective view of FIG. 5.

By using FIG. 5 and FIG. 6, a description is made of how the holder-oriented power feeding electrode 31, the holder-oriented detection electrodes 32 and the voltage information extractor 330 are attached onto the upper tool holder 5 and the lower tool holder 6.

FIG. 5 and FIG. 6 are cut portion perspective views in which the upper tool holder 5 and the lower tool holder 6 are cut at end portions on front sides of the recessed portions 51 and 61 in FIG. 1. As shown in FIG. 5, metal plates 36 are attached onto a sidewall of each of the recessed portions 51 and 61, and circuit boards 37 are attached onto the metal plates 36. Each of the circuit boards 37 includes, as internal constituents, the holder-oriented power feeding electrode 31, the holder-oriented detection electrodes 32 and the voltage information extractor 330. On a front surface of each of the circuit boards 37, there are formed: an insulating film 31ins that covers the holder-oriented power feeding electrode 31; and insulating films 32ins which cover the holder-oriented detection electrodes 32.

As shown in FIG. 6, a recessed portion 40, which houses the metal plates 36 therein, is formed on the sidewall of each of the recessed portions 51 and 61. The sidewall of each of the recessed portions 51 and 61 is an inner wall of each of the upper tool holder 5 and the lower tool holder 6. In the recessed portion 40, two metal pins 41 are embedded in a range where one metal plate 36 is attached. In each of the metal plates 36, holes 36a which correspond to the metal pins 41 are formed. When the metal plates 36 are housed in the recessed portion 40 so as to insert the metal pins 41 into the holes 36a, the metal plates 36 are positioned to the recessed portion 40.

In the range where one metal plate 36 is attached, three holes 42 in insides of which female screws are formed are formed in the recessed portion 40. Holes 36b which correspond to the three holes 42 are formed in each of the metal plates 36. If male screws 43 are fastened to the holes 42 through the holes 36b in the state where the metal plate 36 is positioned to the recessed portion 40, the metal plate 36 is strongly fixed to the recessed portion 40. A fixing method of the metal plates 36 to the recessed portion 40, which is shown in FIG. 6, is merely an example, and the embodiments are not limited to the fixing method shown in FIG. 6.

In the example shown in FIG. 5 and FIG. 6, two circuit boards 37 are attached onto one metal plate 36. The metal plate 36 includes eight protruding portions 36c on end portions thereof in an up-and-down direction of FIG. 5 and FIG. 6. Semicircular notches 37c are formed on end portions of the circuit boards 37 in the up-and-down direction of FIG. 5 and FIG. 6. The notches 37c are engaged with the protruding portions 36c, whereby the circuit boards 37 are fixed to the metal plate 36. A fixing method of the circuit boards 37 to the metal plates 36, which is shown in FIG. 6, is merely an example, and the embodiments are not limited to the fixing method shown in FIG. 6.

Figure 7:
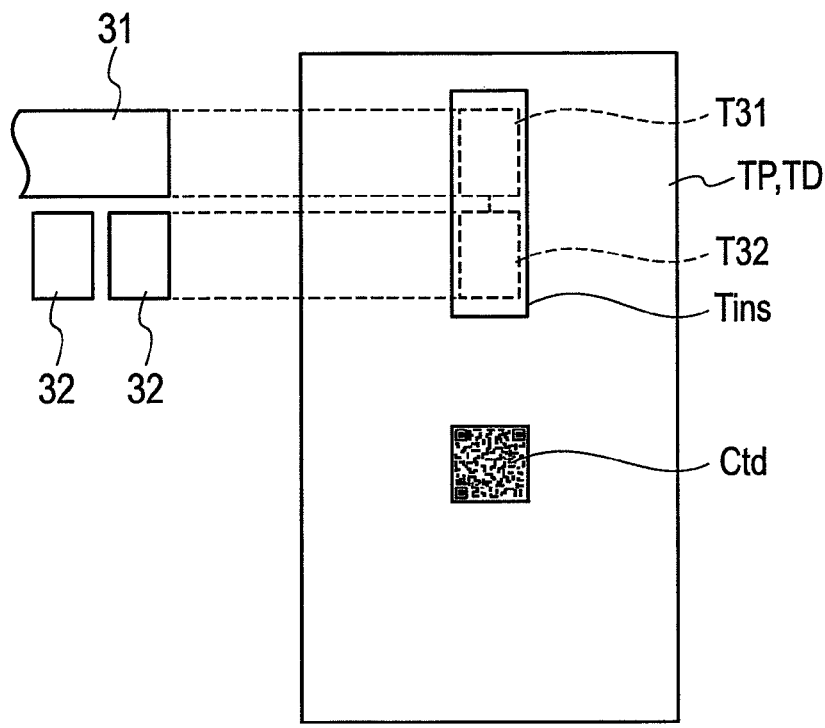
FIG. 7 is a plan view showing schematic configurations of the punch and the die, which are used in the bending device and the tool position detection device.
Figure 8:
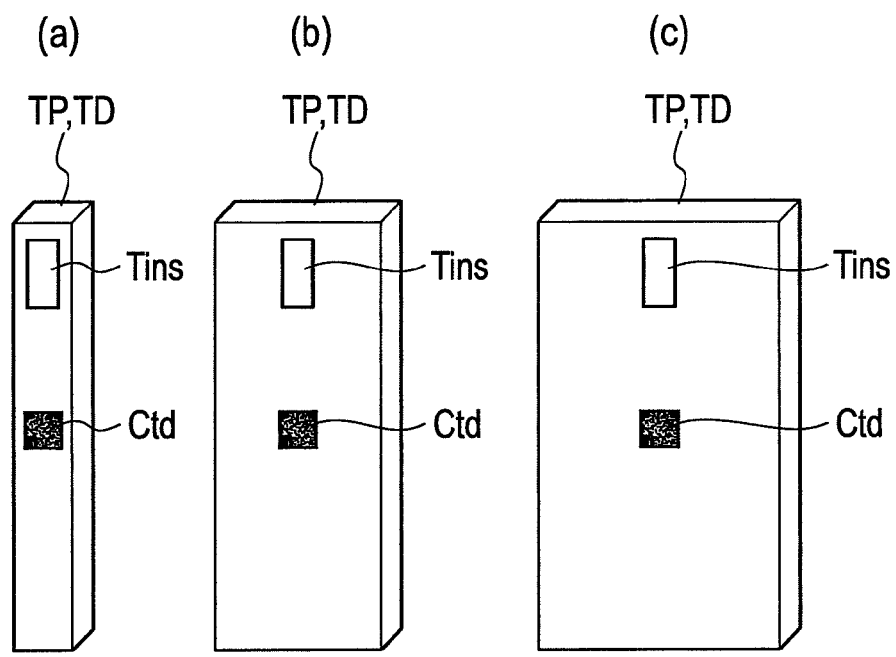
FIG. 8 is a schematic perspective view showing three types of the punch, which are different in width, and three types of the die, which are different in width.

Next, by using FIG. 7 and FIG. 8, a description is made of more detailed configurations of the punches TP and the dies TD. Although the shapes of the punches TP and the dies TD are different from each other as described with reference to FIG. 2, FIG. 7 and FIG. 8 show schematic shapes of the punches TP and the dies TD.

As shown in FIG. 7, each of the punches TP and the dies TD includes a tool-oriented power receiving electrode T31 and a tool-oriented displacement electrode T32. The tool-oriented power receiving electrode T31 and the tool-oriented displacement electrode T32 are coupled to each other by a signal line provided on a center portion in a width direction thereof. The whole of the tool-oriented power receiving electrode T31 and the tool-oriented displacement electrode T32 is covered with the insulating film Tins using, for example, resist. It is not essential to provide the insulating film Tins; however, it is preferable to provide the insulating films Tins.

A length of the tool-oriented power receiving electrode T31 in an up-and-down direction of FIG. 7 is approximately the same as a length in a crosswise direction of the holder-oriented power feeding electrode 31 described with reference to FIG. 4. The crosswise direction of the holder-oriented power feeding electrode 31 is a depth direction of the recessed portions 51 and 61 of the upper tool holder 5 and the lower tool holder 6. A length of the tool-oriented displacement electrode T32 in the up-and-down direction of FIG. 7 is approximately the same as a length in the depth direction of the recessed portions 51 and 61 in the holder-oriented detection electrodes 32 described with reference to FIG. 4.

Preferably, a width of the holder-oriented detection electrodes 32 is approximately the same as a width of the tool-oriented displacement electrode T32. More preferably, the width of the holder-oriented detection electrodes 32 and the width of the tool-oriented displacement electrode T32 are allowed to completely coincide with each other. As a matter of course, dimensions have errors, and accordingly, it is defined that "the same" includes approximately the same state.

In the example shown in FIG. 7, the widths of the tool-oriented power receiving electrode T31 and the tool-oriented displacement electrode T32 are made the same; however, the width of the tool-oriented power receiving electrode T31 may be widened more than the width of the tool-oriented displacement electrode T32.

(a), (b) and (c) of FIG. 8 show three types of the punches TP different in width from one another, and three types of the dies TD different in width from one another. (a) of FIG. 8 shows the punch TP and the die TD, in which the width is 10 mm that is the narrowest. Preferably, the tool-oriented power receiving electrode T31 and the tool-oriented displacement electrode T32 are provided at a fixed width on the center in the width direction of each of the punch TP and the die TD no matter what width the punch TP and the die TD may have. Since the width of the narrowest punch TP and the die TD is 10 mm, the width of the tool-oriented power receiving electrode T31 and the tool-oriented displacement electrode T32 is set at, for example, 5 mm.

It is also preferable to provide the two-dimensional code Ctd on the center in the width direction of each of the punch TP and the die TD.

As shown in (a) of FIG. 9, the punch TP is inserted into the recessed portion 51 of the upper tool holder 5 from a side thereof on which the tool-oriented power receiving electrode T31 and the tool-oriented displacement electrode T32 are formed, and the punch TP is attached into the upper tool holder 5. Then, as shown in (b) of FIG. 9, the tool-oriented power receiving electrode T31 is opposite to the holder-oriented power feeding electrode 31, and the tool-oriented displacement electrode T32 is opposite to the holder-oriented detection electrode 32.

In a similar way, the die TD is attached into the recessed portion 61 of the lower tool holder 6 from a side thereof on which the tool-oriented power receiving electrode T31 and the tool-oriented displacement electrode T32 are formed. Then, the tool-oriented power receiving electrode T31 is opposite to the holder-oriented power feeding electrode 31, and the tool-oriented displacement electrode T32 is opposite to the holder-oriented detection electrode 32.

Note that, in FIG. 9, for the sake of simplification, illustration of the metal plate 36 described with reference to FIG. 6 is omitted, and only the holder-oriented power feeding electrode 31 and the holder-oriented detection electrode 32 are shown. Moreover, in FIG. 9, illustration of the insulating films Tins is omitted.

As shown in (b) of FIG. 9, if the holder-oriented power feeding electrode 31 and the tool-oriented power receiving electrode T31 are definitely spaced apart from each other, and in addition, if the holder-oriented detection electrode 32 and the tool-oriented displacement electrode T32 are definitely spaced apart from each other, then the holder-oriented power feeding electrode 31 and the tool-oriented power receiving electrode T31 do not contact each other, and in addition, the holder-oriented detection electrode 32 and the tool-oriented displacement electrode T32 do not contact each other. Hence, the insulating films 31ins, 32ins and Tins are necessarily unnecessary.

However, in a case where a distance between the holder-oriented power feeding electrode 31 and tool-oriented power receiving electrode T31 and a distance between the holder-oriented detection electrode 32 and the tool-oriented displacement electrode T32 are relatively short, it becomes necessary to provide the insulating films 31ins, 32ins and Tins.

The holder-oriented power feeding electrode 31 and the tool-oriented power receiving electrode T31 just need to be close and opposite to each other without contacting each other. The holder-oriented detection electrode 32 and the tool-oriented displacement electrode T32 just need to be close and opposite to each other without contacting each other. In the case where the insulating films 31ins, 32ins and Tins are provided, the insulating films 31ins and 32ins and the insulating film Tins may contact each other. Also in this case, the holder-oriented power feeding electrode 31 and the tool-oriented power receiving electrode T31 are close and opposite to each other without contacting each other, and the holder-oriented detection electrode 32 and the tool-oriented displacement electrode T32 are close and opposite to each other without contacting each other.

Figure 10:
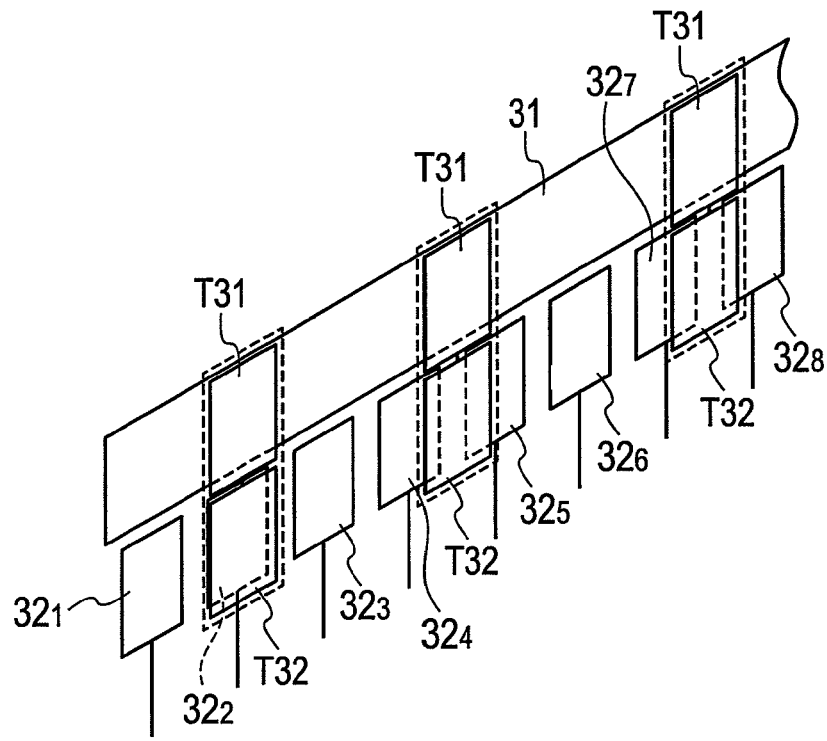
FIG. 10 is a partial perspective view showing an example of a positional relationship in which a holder-oriented power feeding electrode and holder-oriented detection electrodes are opposite to each other and tool-oriented power receiving electrodes and tool-oriented displacement electrodes are opposite to each other in a case where a plurality of the punches are attached onto the upper tool holder.

FIG. 10 illustrates only the holder-oriented power feeding electrode 31 and the holder-oriented detection electrode 32 and the tool-oriented power receiving electrode T31 and the tool-oriented displacement electrode T32 when three punches TP are attached onto the upper tool holder 5. In the case where the die TD is attached onto the lower tool holder 6, up-and-down direction therein becomes inverted from that of FIG. 10. The punches TP and the dies TD are attached onto the upper tool holder 5 and the lower tool holder 6 at positions in the longitudinal direction, which are in accordance with the setup information.

Hence, in some case, the tool-oriented displacement electrode T32 is opposite to the holder-oriented detection electrode 32 so as to just coincide therewith, and in some cases, is opposite to two holder-oriented detection electrodes 32 so as to be astride the same.

FIG. 10 shows an example where there are present: the tool-oriented displacement electrode T32 opposite to the holder-oriented detection electrode 32 so as to just coincide therewith; the tool-oriented displacement electrode T32 opposite to two holder-oriented detection electrodes 32 so as to be equally astride the same; and the tool-oriented displacement electrode T32 opposite to two holder-oriented detection electrodes 32 so as to be shifted to one side thereof.

Figure 11:
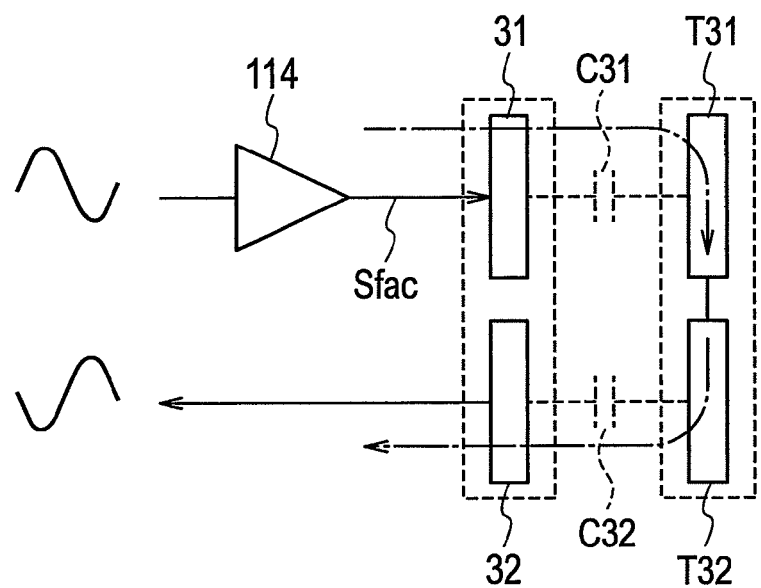
FIG. 11 is a view for explaining that a capacitor circuit is formed of: the holder-oriented power feeding electrode and the tool-oriented power receiving electrode, which are opposite to each other; and the holder-oriented detection electrode and the tool-oriented displacement electrode, which are opposite to each other.

By using FIG. 11, a description is made of functions of the holder-oriented power feeding electrode 31 and the tool-oriented power receiving electrode T31, which are opposite to each other, and of the holder-oriented detection electrode 32 and the tool-oriented displacement electrode T32, which are opposite to each other. In FIG. 11, for facilitating the understanding, it is assumed that the tool-oriented displacement electrode T32 is opposite to one holder-oriented detection electrode 32 so as to just coincide therewith.

As shown in FIG. 11, the holder-oriented power feeding electrode 31 and the tool-oriented power receiving electrode T31 are close and opposite to each other without contacting each other, and accordingly, a pair of the holder-oriented power feeding electrode 31 and the tool-oriented power receiving electrode T31 forms a parallel plate capacitor C31. The parallel plate capacitor C31 is a first capacitor.

Moreover, the holder-oriented detection electrode 32 and the tool-oriented displacement electrode T32 are close and opposite to each other without contacting each other, and accordingly, a pair of the holder-oriented detection electrode 32 and the tool-oriented displacement electrode T32 forms a parallel plate capacitor C32. The parallel plate capacitor C32 is a second capacitor.

When the alternating current power feeding signal Sfac is supplied to the holder-oriented power feeding electrode 31 as mentioned above, charges are accumulated in the parallel plate capacitor C31. Since the tool-oriented power receiving electrode T31 and the tool-oriented displacement electrode T32 are connected to each other, charges are also accumulated in the parallel plate capacitor C32. Then, it becomes possible to extract the voltage information of the alternating current signal from the holder-oriented detection electrode 32. The alternating current signal extracted from the holder-oriented detection electrode 32 is amplified by the amplifier 34, and becomes the voltage information signal Siec.

A capacitor capacity of the capacitor C31, which is composed of the holder-oriented power feeding electrode 31 and the tool-oriented power receiving electrode T31, is not changed since an area of such opposite surfaces thereof is not increased or decreased even though the position of the tool is changed. Meanwhile, a capacitor capacity of the capacitor C32, which is composed of the holder-oriented detection electrode 32 and the tool-oriented displacement electrode T32, is largely changed in response to a change in the position of the tool.

The capacitor C31, which is composed of the holder-oriented power feeding electrode 31 and the tool-oriented power receiving electrode T31, and the capacitor C32, which is composed of the holder-oriented detection electrode 32 and the tool-oriented displacement electrode T32, form a serial capacitor circuit. A capacitor capacity of this capacitor circuit is increased and decreased in response to a positional relationship between the holder-oriented detection electrode. 32 and the tool-oriented displacement electrode T32.

Figure 12:
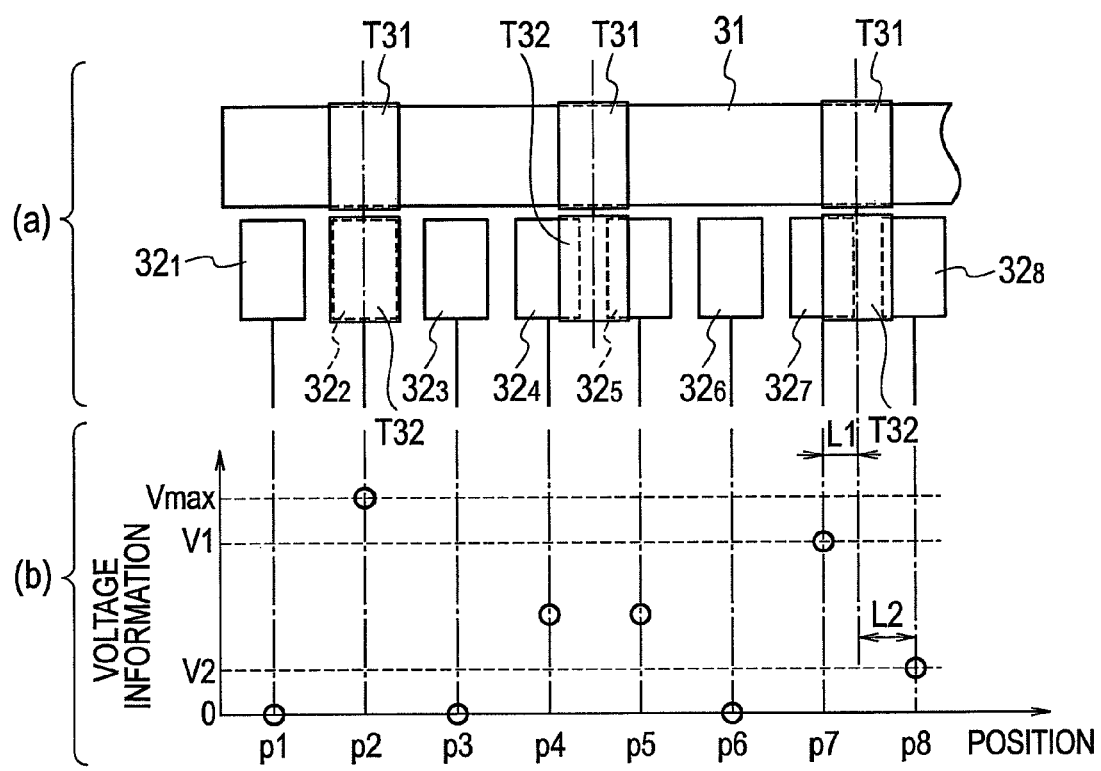
FIG. 12 is a view for explaining that voltage information, which is extracted from the holder-oriented detection electrodes, is changed in response to a relative positional relationship between the holder-oriented detection electrodes and the tool-oriented displacement electrodes.

By using FIG. 12, a description is made of how the voltage information signal Siec is obtained depending on a difference in the relative positional relationship between the holder-oriented detection electrode 32 and the tool-oriented displacement electrode T32.

In FIG. 12, (a) is equivalent to a plan view of FIG. 10. The tool-oriented displacement electrode T32 on a leftmost side is opposite to the holder-oriented detection electrode $32_2$ so as to just coincide therewith. The second left tool-oriented displacement electrode T32 is opposite to the holder-oriented detection electrode $32_4$ and the holder-oriented detection electrode $32_5$ so as to be equally astride the same. The third left tool-oriented displacement electrode T32 is opposite to the holder-oriented detection electrodes $32_7$ and $32_8$ in a state of being shifted to the holder-oriented detection electrode $32_7$ side.

IN FIG. 12, (b) shows voltage information detected by the individual holder-oriented detection electrodes 32 when the tool-oriented displacement electrodes T32 are present as in (a) of FIG. 12. An axis of abscissas in (b) of FIG. 12 represents positions. At the individual positions p1, p2, p3 . . . , the voltage information is obtained from the sequentially selected holder-oriented detection electrodes 32. An axis of ordinates in (b) of FIG. 12 represents the voltage information, and each piece of the voltage information is a digital value obtained by converting the voltage information signal Siec into a digital signal by the A/D converter 113. The position detector/arithmetic operator 111 stores the voltage information thus obtained sequentially.

As shown in (b) of FIG. 12, the voltage information obtained from the holder-oriented detection electrode 32, which is not opposite to the tool-oriented displacement electrode T32, remains at an extremely small level since the above-mentioned capacitor C31 and capacitor C32 are not formed. That is to say, voltage information with a predetermined level or more is not outputted from the holder-oriented detection electrode 32 that is not opposite to the tool-oriented displacement electrode T32, and the voltage information is approximately zero. The holder-oriented detection electrode $32_2$ is opposite to the tool-oriented displacement electrode T32 so as to just coincide therewith, and accordingly, the maximum voltage information signal Siec is obtained from the amplifier $34_2$ connected to the holder-oriented detection electrode $32_2$. Hence, the voltage information, which is obtained at the position p2 so as to correspond to the holder-oriented detection electrode $32_2$, reaches a predetermined maximum value Vmax.

In the holder-oriented detection electrodes $32_4$ and $32_5$, the tool-oriented displacement electrode T32 is equally and partially opposite thereto, and accordingly, voltage information signals Siec with the same value smaller than the maximum voltage information signal Siec is obtained from the amplifier $34_4$ connected to the holder-oriented detection electrode $32_4$ and from the amplifier $34_5$ connected to the holder-oriented detection electrode $32_5$. Hence, the voltage information obtained at the position p4 so as to correspond to the holder-oriented detection electrode $32_4$ and the voltage information obtained at the position p5 so as to correspond to the holder-oriented detection electrode $32_5$ becomes the same value.

In the holder-oriented detection electrodes $32_7$ and $32_8$, the tool-oriented displacement electrode T32 is unequally opposite thereto so as to be opposite to the holder-oriented detection electrode $32_7$ to a large extent and so as to be opposite to the holder-oriented detection electrode $32_8$ to a small extent. Accordingly, such a voltage information signal Siec obtained from the amplifier $34_7$ connected to the holder-oriented detection electrode $32_7$ becomes a larger value, and such a voltage information signal Siec obtained from the amplifier $34_8$ connected to the holder-oriented detection electrode $32_8$ becomes a smaller value. Both of the voltage information signals Siec obtained from the amplifiers $34_7$ and $34_8$ take smaller values than the maximum voltage information signal Siec.

Hence, the voltage information obtained at the position p7 so as to correspond to the holder-oriented detection electrode $32_7$ and the voltage information obtained at the position p8 so as to correspond to the holder-oriented detection electrode $32_8$ establish a relationship as shown in (b) of FIG. 12.

Based on the values of the voltage information, which are as shown in (b) of FIG. 12, or based on changes of the values of the voltage information, which correspond to the positions, the position detector/arithmetic operator 111 detects onto which positions in the longitudinal direction of the upper tool holder 5 and the lower tool holder 6 the punches TP and the dies TD are attached.

The position detector/arithmetic operator 111 can roughly grasp the position of each of the punches TP or each of the dies TD based on each magnitude of the voltage information, which is shown in (b) of FIG. 12. Then, by an arithmetic operation for the position detection, which will be described below, a fine and precise position of the punch TP or the die TD can be obtained. When this is compared to a Vernier caliper as an example, the former one is equivalent to a main scale of the Vernier caliper, and the latter one is equivalent to a sub-scale of the Vernier caliper.

First, a description is made of an example of a position detection method in a case where an interval between the holder-oriented power feeding electrode 31 and the tool-oriented power receiving electrode T31 is constant and an interval between the holder-oriented detection electrode 32 and the tool-oriented displacement electrode T32 is constant. In a case where a difference between an interval of the recessed portions 51 and 61 and a thickness of the punches TP and the dies TD is small, and an interval between the circuit boards 37 and the punches TP or the dies TD become approximately constant, then the interval between the holder-oriented power feeding electrode 31 and the tool-oriented power receiving electrode T31 and the interval between the holder-oriented detection electrode 32 and the tool-oriented displacement electrode T32 can be regarded to be constant.

Figure 13:
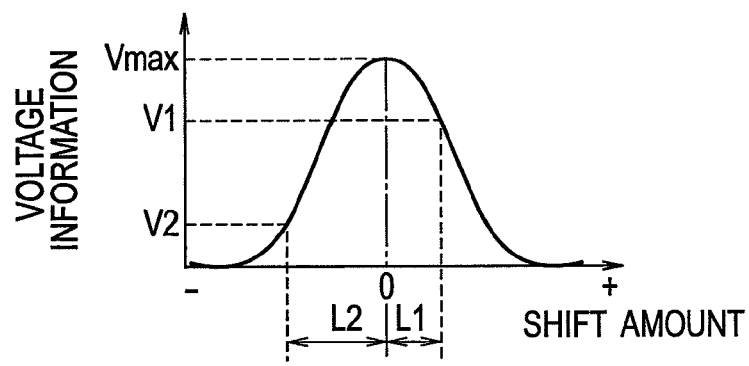
FIG. 13 is a characteristic chart of a first example shown by the voltage information changed in response to a positional shift between the holder-oriented detection electrode and the tool-oriented displacement electrode, which are opposite to each other.

As shown in FIG. 13, the voltage information that is the digital value obtained by converting the voltage information signal Siec into the digital signal has characteristics of becoming the maximum value Vmax in the case where the holder-oriented detection electrode 32 and the tool-oriented displacement electrode T32 are opposite to each other so as to just coincide therewith, and gradually become smaller in response to a shift amount between the holder-oriented detection electrode 32 and the tool-oriented displacement electrode T32. A shift in a case where the tool-oriented displacement electrode T32 is shifted in a left direction in (a) of FIG. 12 with respect to the holder-oriented detection electrode 32 is defined as a negative (−) shift, and a shift in a case where the tool-oriented displacement electrode T32 is shifted in a left direction in (a) of FIG. 12 with respect thereto is defined as a positive (+) shift.

If the interval between the holder-oriented power feeding electrode 31 and the tool-oriented power receiving electrode T31 and the interval between the holder-oriented detection electrode 32 and the tool-oriented displacement electrode T32 are constant, then the value of the voltage information is absolutely determined in response to the shift amount between the holder-oriented detection electrode 32 and the tool-oriented displacement electrode T32.

The characteristic information holder 112 holds, as characteristics information, characteristics indicating a relationship between the shift amount and the voltage information, which is shown in FIG. 13. For example, in a case where the maximum value Vmax of a predetermined voltage value is obtained as the voltage information, the position detector/arithmetic operator 111 can detect that the tool-oriented displacement electrode T32 is located at a position that just coincides with the holder-oriented detection electrode 32.

An example is taken where the tool-oriented displacement electrode T32 is opposite to the holder-oriented detection electrodes $32_7$ and $32_8$ in the state of being shifted to the holder-oriented detection electrode $32_7$ side. Based on voltage values V1 and V2 obtained as the voltage information, the position detector/arithmetic operator 111 can obtain a shift amount L1 between the center in the width direction of the tool-oriented displacement electrode T32 and a center in a width direction of the holder-oriented detection electrode $32_7$ and a shift amount L2 between the center in the width direction of the tool-oriented displacement electrode T32 and a center in a width direction of the holder-oriented detection electrode $32_8$.

By the shift amounts L1 and L2, the position detector/arithmetic operator 111 can detect the position of the tool-oriented displacement electrode T32 (that is, the position of the punch TP or the die TD).

Next, a description is made of an example of a position detection method in a case where the interval between the holder-oriented power feeding electrode 31 and the tool-oriented power receiving electrode T31 is not necessarily constant and the interval between the holder-oriented detection electrode 32 and the tool-oriented displacement electrode T32 is not necessarily constant. In a case where the interval between the circuit boards 37 and the punches TP or the dies TD is not constant, the characteristics shown in FIG. 13 are changed in response to the interval. In this case, the value of the voltage information is not determined absolutely.

Accordingly, the position detector/arithmetic operator 111 detects the position of the tool-oriented displacement electrode T32 in the following manner. The position detector/arithmetic operator 111 can detect the rough position of the tool-oriented displacement electrode T32 by the change of the value of the voltage information, which is shown in (b) of FIG. 12. If the voltage information is changed from zero through the maximum value Vmax to zero as at the positions p1 to p3, then the position detector/arithmetic operator 111 can detect that the tool-oriented displacement electrode T32 is opposite to the holder-oriented detection electrode $32_2$ so as to just coincide therewith.

In a case where predetermined voltage values exceeding zero are obtained in the two adjacent holder-oriented detection electrodes 32 as at the positions p4 and p5 and the positions p7 and p8, then the position detector/arithmetic operator 111 can detect that the tool-oriented displacement electrode T32 is astride two holder-oriented detection electrodes 32. Then, the position detector/arithmetic operator 111 specifies the position of the tool-oriented displacement electrode T32 based on a relative relationship between the voltage values V1 and V2, which correspond to the two adjacent holder-oriented detection electrodes 32.

The position detector/arithmetic operator 111 can obtain the position of the tool-oriented displacement electrode T32 when the tool-oriented displacement electrode T32 is astride the two adjacent holder-oriented detection electrodes 32 by calculating, for example the following Expression (1):

$$(V1-V2)/(V1+V2) \qquad (1)$$

A numerator of Expression (1) may be (V2−V1).

It is assumed that the maximum value Vmax is 10 mV, that the voltage values obtained at the positions p4 and p5 are 5 mV, that the voltage value obtained at the position p7 is 8 mV, and that the voltage value obtained at the position p8 is 2 mV. These numeric values are mere examples. In the case where the tool-oriented displacement electrode T32 is equally astride the holder-oriented detection electrodes $32_4$ and $32_5$, a solution of Expression (1) is obtained as zero from (5−5)/(5+5). That is to say, if the value calculated by an equation of Expression (1) is zero, then the tool-oriented displacement electrode T32 is located at the position equally astride the two adjacent holder-oriented detection electrodes 32.

In the case where the tool-oriented displacement electrode T32 is astride the holder-oriented detection electrode $32_7$ and $32_8$ in the state of being shifted to the holder-oriented detection electrode $32_7$ side, the solution of Expression (1) is obtained as 0.6 from (8−2)/(8+2). In the equation of Expression (1), as the calculated value is a larger positive value than zero, the tool-oriented displacement electrode T32 is shifted more in the left direction in (a) of FIG. 12 in the two adjacent holder-oriented detection electrodes 32. Moreover, as the calculated value is a smaller negative value than zero, the tool-oriented displacement electrode T32 is shifted more in the right direction in (a) of FIG. 12 in the two adjacent holder-oriented detection electrodes 32.

As described above, in such a case where the predetermined voltage values exceeding zero are obtained in the two adjacent holder-oriented detection electrodes 32, the position detector/arithmetic operator 111 uses the equation of Expression (1), and can thereby detect at which relative position to the two adjacent holder-oriented detection electrodes 32 the tool-oriented displacement electrode T32 is located.

Such a method of detecting at which position the tool-oriented displacement electrode T32 is located relatively to the two adjacent holder-oriented detection electrodes 32 is not limited to the above-described detection method using the arithmetic operation. The position may be detected in the following manner.

Figure 14:
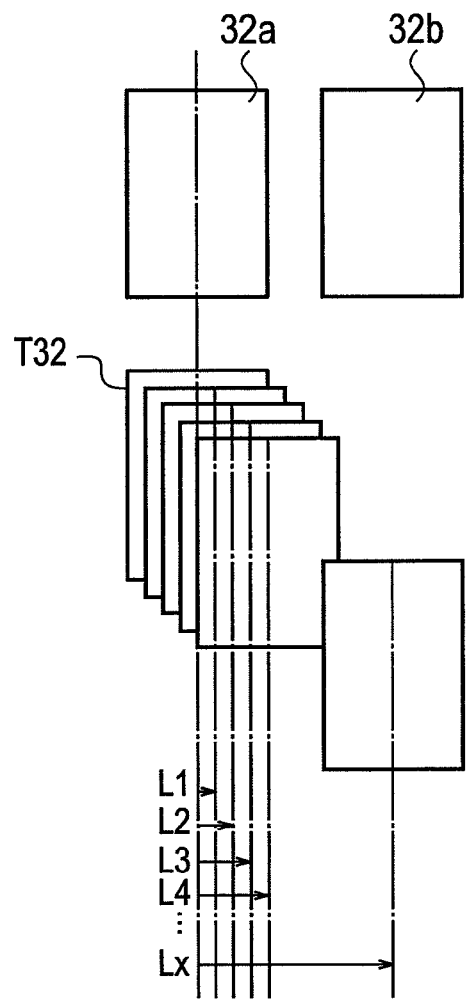
FIG. 14 is a view for explaining amounts of the positional shift between the holder-oriented detection electrodes and the tool-oriented displacement electrode, which are opposite to each other.

FIG. 14 shows a positional relationship between the two adjacent holder-oriented detection electrode 32 and the tool-oriented displacement electrode T32. In FIG. 14, for facilitating the understanding, the holder-oriented detection electrodes 32 and the tool-oriented displacement electrode T32 are illustrated so as to be shifted from each other in the up-and-down direction. Between the two holder-oriented detection electrodes 32, the left holder-oriented detection electrode 32 is referred to as a holder-oriented detection electrode 32a, and the right holder-oriented detection electrode 32 is referred to as a holder-oriented detection electrode 32b.

When the holder-oriented detection electrode 32a and the tool-oriented displacement electrode T32 are just opposite to each other, a shift amount therebetween is zero. When the tool-oriented displacement electrode T32 is gradually shifted to the holder-oriented detection electrode 32b side, the shift amount is increased as L1, L2, L3, L4 . . . , Lx.

Figures 15, 16:
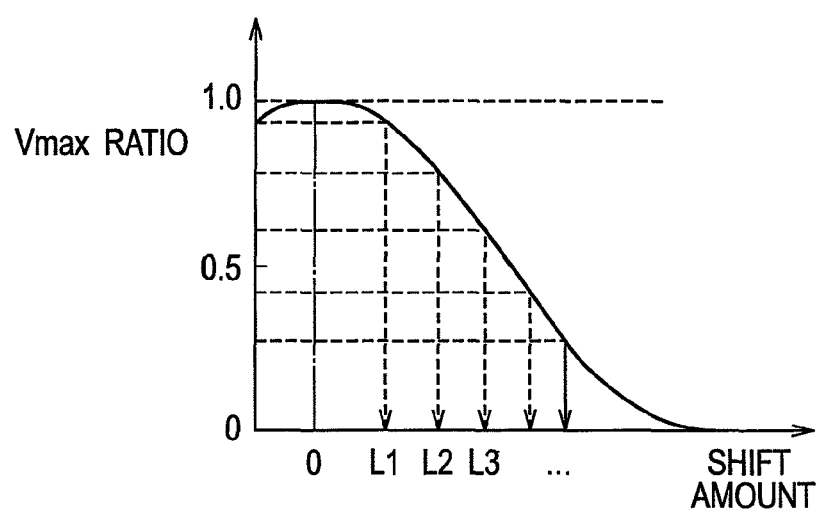
FIG. 15 is a table showing examples of voltage values obtained from the holder-oriented detection electrodes in response to amounts of the positional shift between the holder-oriented detection electrodes and the tool-oriented displacement electrode, which are opposite to each other.
FIG. 16 is a characteristic chart of a second example shown by the voltage information changed in response to the positional shift between the holder-oriented detection electrodes and the tool-oriented displacement electrode, which are opposite to each other.

FIG. 15 shows examples of the voltage values obtained from the holder-oriented detection electrodes 32a and 32b in response to such shift amounts of the tool-oriented displacement electrode T32 with respect to the holder-oriented detection electrode 32a. Numeric values of the voltage values, which are shown in FIG. 15, are mere examples. As shown in FIG. 15, total voltages obtained by summing up the voltage values obtained from the holder-oriented detection electrodes 32a and 32b are constant irrespective of the shift amounts, and the total voltages become the same as the maximum value Vmax. FIG. 15 shows Vmax ratios obtained by dividing the voltage values from the holder-oriented detection electrode 32a by the maximum value Vmax.

FIG. 16 shows characteristics when an axis of abscissas represents the shift amounts and an axis of ordinates represents the Vmax ratios. As shown in FIG. 16, if the Vmax ratio is obtained, then the shift amounts from the holder-oriented detection electrode 32 (holder-oriented detection electrode 32a in FIG. 14) taken as a reference can be obtained.

Unless the interval between the circuit board 37 and the punch TP or the die TD is constant, the characteristics shown in FIG. 16 are changed. In each bending device, the relative relationship between the upper tool holder 5 and the punch TP and the relative relationship between the lower tool holder 6 and the die TD are determined to be substantially constant. In each bending device, the relationships between the Vmax ratios and the shift amounts are measured in advance.

Figures 17, 18:
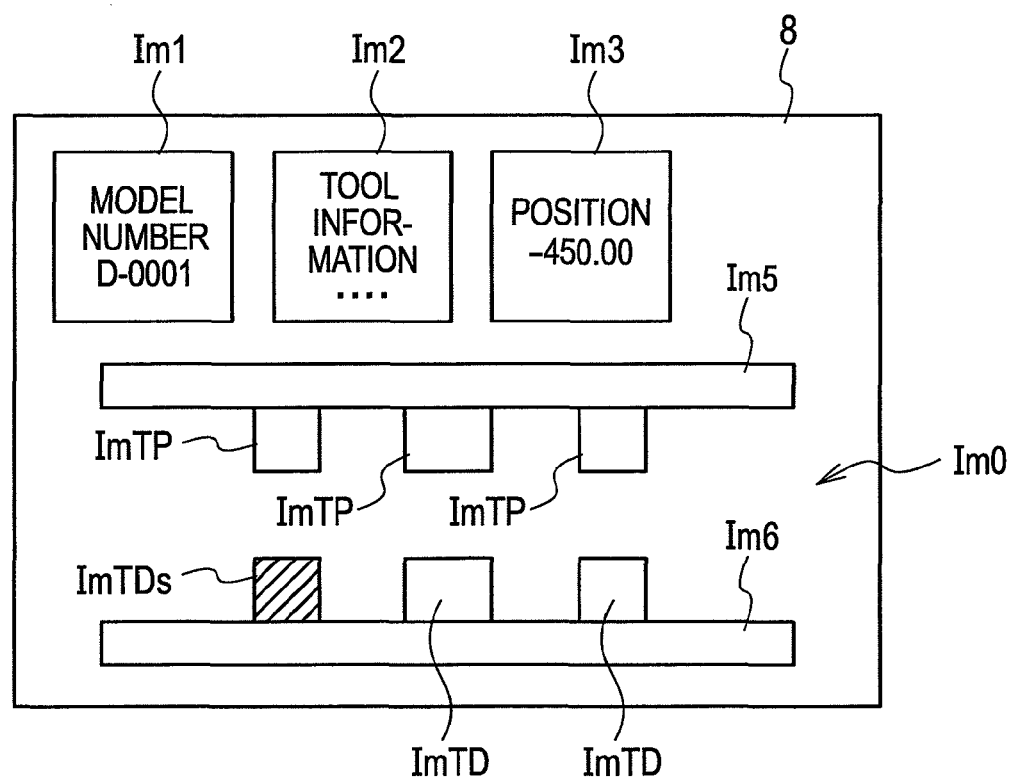
FIG. 17 is a diagram showing an example of a table held by a characteristic information holder.
FIG. 18 is a diagram conceptually showing setup information.

The characteristic information holder 112 holds, as characteristics information, a table showing the relationships between the Vmax values and the shift amounts, which is as shown in FIG. 17. The position detector/arithmetic operator 111 obtains the Vmax ratios based on the voltage values, which are obtained by converting the voltage information signals Siec from the two adjacent holder-oriented detection electrodes 32 into the digital signals. The position detector/arithmetic operator 111 obtains the shift amounts by referring to the table as shown in FIG. 17.

As described above, the position detector/arithmetic operator 111 can finely and precisely detect at which position (that is, the position of the punch TP or the die TD) the tool-oriented displacement electrode T32 is located relatively to the two adjacent holder-oriented detection electrodes 32.

The characteristic information holder 112 may be allowed to hold an approximate expression, which represents the relationships between the Vmax ratios and the shift amounts, which are shown in FIG. 16, in place of the table as shown in FIG. 17. The position detector/arithmetic operator 111 may obtain the shift amounts based on the approximate expression.

The position information of the punches TP and the dies TD in the longitudinal direction of the upper tool holder 5 and the lower tool holder 6, which is detected by the tool position detection unit 11 as described above, is inputted to the NC unit 10. The NC unit 10 can determine whether or not the punches TP and the dies TD are attached to correct positions instructed by the setup information.

By using FIG. 18, a conceptual description is made of the setup information displayed on the operation/display panel 8. By using a flowchart of FIG. 19, a description is made of an example of the operations of the bending device 100 in the event of attaching the punches TP and the dies TD onto the upper tool holder 5 and the lower tool holder 6 and bending the plate material based on the setup information shown in FIG. 18.

In the event of bending the plate material in the predetermined way by the bending device 100, when the operator performs an operation to read out the setup information by the operation/display panel 8, the NC unit 10 reads out the setup information from the setup information DB 23. The NC unit 10 displays the setup information on a screen of the operation/display panel 8 as shown in FIG. 18.

As shown in FIG. 18, the setup information includes an image Im0 showing to which positions of the punch TP and the die TD the punches TP and the dies TD should be attached. The image Im0 includes: an upper tool holder image Im5 showing the upper tool holder 5; a lower tool holder image Im6 showing the lower tool holder 6; punch images ImTP showing the punches TP; and die images ImTD showing the dies TD.

FIG. 18 shows a state where one die image ImTD, which is hatched, is selected. The selected die ImTD is defined as a die image ImTDs. The setup information includes a model number display image Im1 showing a model number "D-0001" of the die image ImTDs. The model number "D-0001" is a mere example. The model number just needs to be one that identifies each of the pluralities of punches TP and dies TD.

Moreover, the setup information includes: a tool information display image Im2 showing tool information of the die image ImTDs; and a position information display image Im3 showing to which position the die image ImTDs should be attached. The position information display image Im3 shows that the leftmost die TD displayed as the die image ImTDs is attached to a position of −450.00 (mm), that is, a position on the left side by 450 mm from the center in the longitudinal direction of the lower tool holder 6. The position "−450.00" is a mere example.

If each of the punch images ImTP and the die images ImTD, which individually show the punches TP and the dies TD, is selected, then the model number display image Im1, the tool information display image Im2 and the position information display image Im3, which correspond to each of the punch images ImTP and the die images ImTD, are displayed.

FIG. 18 conceptually shows the setup information displayed on the screen of the operation/display panel 8. The model number display image Im1, the tool information display image im2 and the position information display image Im3 do not have to be displayed on one screen at the same time. When an operation to display each of the images is performed, one or a plurality of the model number display image Im1, the tool information display image im2 and the position information display image Im3 may be displayed selectively.

The operator or a robot (including an ATC) controlled by the NC unit 10 attaches the punches TP and the dies TD onto the upper tool holder 5 and the lower tool holder 6, respectively based on the setup information.

Figure 19:
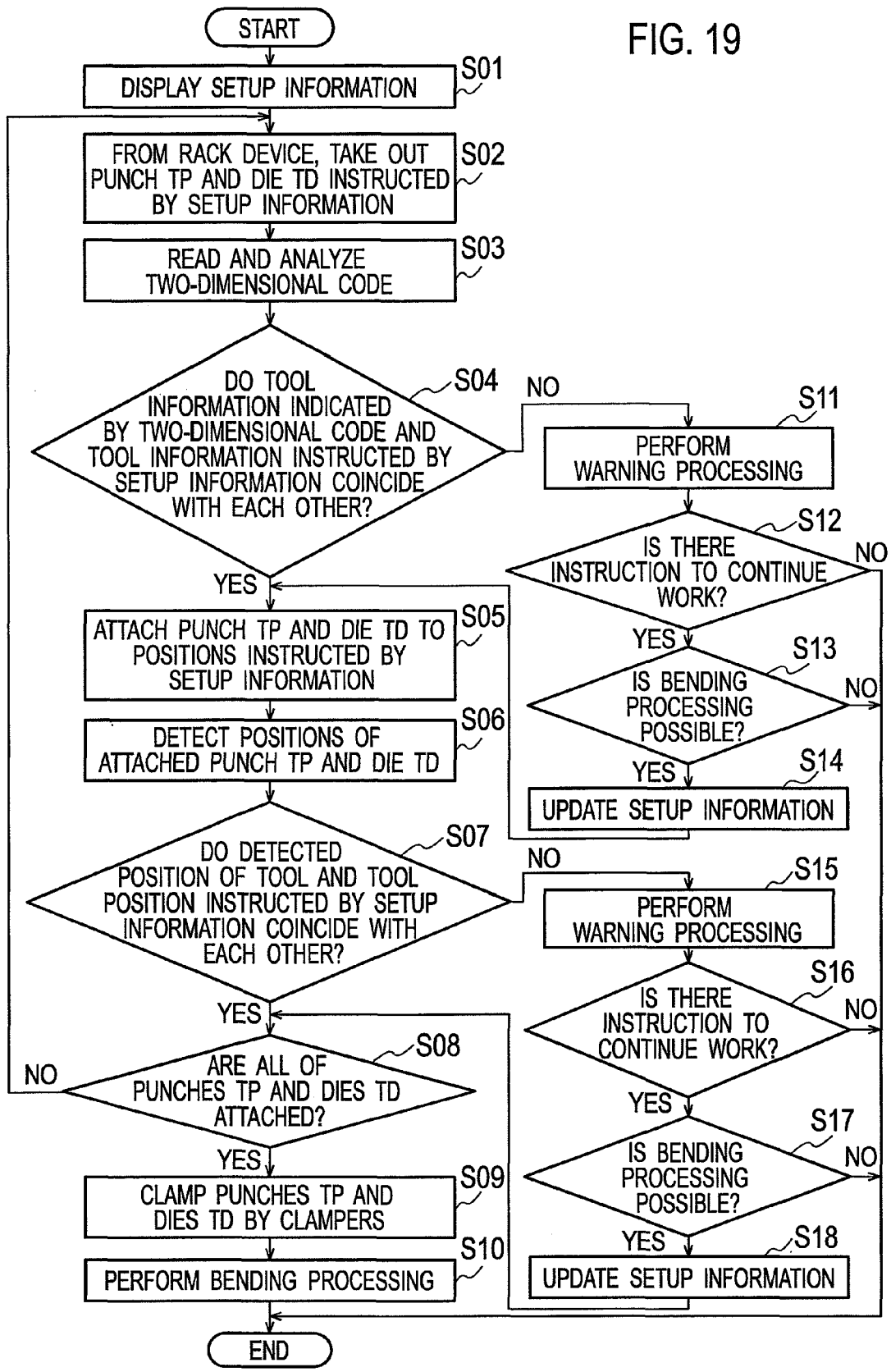
FIG. 19 is a flowchart for explaining a first operation example of the bending device of the first embodiment.

The flowchart shown in FIG. 19 basically shows the processing by the NC unit 10, and in some case, includes work partially performed by the operator. In FIG. 19, when processing for bending the plate material is started, then in Step S01, the NC unit 10 displays the setup information on the screen of the operation/display panel 8.

In a case where the operator takes out the punch TP and the die TD from the rack device, then in Step S02, the operator takes out the punch TP or the die TD, which is instructed by the setup information. In a case of using the robot, then in Step S02, the NC unit 10 takes out the punch TP or the die TD, which is instructed by the setup information, from the rack device by the robot.

When the operator brings the two-dimensional code reader 9 near the two-dimensional code Ctd formed on the punch TP or the die TD, the NC unit 10 analyzes the two-dimensional code Ctd read by the two-dimensional code reader 9. In the case of using the robot, it is preferable to provide the two-dimensional code reader 9 on a tip end of the hand of the robot. In this case, in Step S03, the NC unit 10 allows the two-dimensional code reader 9, which is provided on the hand of the robot, to read the two-dimensional code Ctd, and analyzes the read two-dimensional code Ctd.

In Step S04, the NC unit 10 collates the tool information, which is indicated by the two-dimensional code Ctd, and the tool information of the punch TP or the die TD, which is instructed by the setup information, with each other, and determines whether or not both pieces of the tool information coincide with each other.

In a case where both pieces of the tool information coincide with each other (YES in Step S04), then in Step S05, the operator attaches the punch TP or the die TD, which is taken out from the rack device, onto the upper tool holder 5 or the lower tool holder 6. In the case of using the robot, then in Step S05, the NC unit 10 allows the robot to attach the punch TP or the die TD, which is taken out from the rack device, onto the upper tool holder 5 or the lower tool holder 6.

In Step S06, the NC unit 10 allows the tool position detection device of the above-mentioned embodiment to detect the position in the longitudinal direction, onto which the punch TP or the die TD is attached. The tool position detection device always performs the detection operation in a state where a power supply of the bending device 100 is turned on. Hence, if the voltage information from the holder-oriented detection electrode 32 at the position to which the punch TP or the die TD is attached is inputted from the voltage information extractor 330 to the tool position detection unit 11, then the attachment position is detected.

In Step S07, the NC unit 10 determines whether or not the position of the punch TP or the die TD, which is detected by the tool position detection unit 11 (position detector/arithmetic operator 111), and the position instructed by the setup information coincide with each other.

In a case where both of the positions coincide with each other (YES in Step S07), then in Step S08, the NC unit 10 determines whether or not all of the punches TP and the dies TD, which are instructed by the setup information, are attached. If all of the punches TP and the dies TD are not attached (NO in Step S08), the processing is returned to Step S02.

If all of the punches TP and the dies TD are attached in an order instructed by the setup information, then it is determined that all of the punches TP and the dies TD are attached (YES in Step S08).

In Step S09, the NC unit 10 allows the damper to clamp each of the punches TP and the dies TD.

When the operator operates the operation/display panel 8 to issue an instruction to start the bending processing, then in Step S10, the NC unit 10 executes the bending processing, and then ends the same.

Meanwhile, in a case where the tool information, which is indicated by the two-dimensional code Ctd, and the tool information of the punch TP or the die TD, which is instructed by the setup information, do not coincide with each other (NO in Step S04), then it means an erroneous tool that is not the punch TP or the die TD, which is instructed by the setup information, is taken out. Accordingly, In Step S11, the NC unit 10 executes predetermined warning processing.

The warning processing in Step S11 is, for example, processing for informing the operator that the attached tool is not the punch TP or the die TD, which is instructed by the setup information, and advising the operator to take out the correct punch TP or die TD, which is instructed by the setup information. This is particularly effective for such a case where the operator performs Step S02.

The operator just needs to take out the correct punch TP or die TD from the rack device according to needs, and to allow the two-dimensional code reader 9 to read the two-dimensional code Ctd.

In Step S12, the NC unit 10 determines whether or not there is an instruction to continue the work. For example, the NC unit 10 allows the operation/display panel 8 to display buttons for selecting "continue" and "discontinue", and determines which thereof is selected. If the instruction to continue the work is issued by the fact that the button of "continue" is operated (YES in Step S12), then in Step S13, the NC unit 10 determines whether or not the bending processing is possible.

In a case of having determined that the bending processing is possible (YES in Step S13), the NC unit 10 recalculates the setup, and updates the setup information in Step S14. When the setup information is updated, the operator or the NC unit 10 transfers the processing to Step S05 described above.

If the instruction to discontinue the work is issued by the fact that the button of "discontinue" is operated (NO in Step S12), or if it is not determined that the bending processing is possible (No in Step S13), the NC unit 10 ends the processing.

In a case where the position of the punch TP or the die TD, which is detected by the tool position detection unit 11, and the position instructed by the setup information do not coincide with each other (NO in Step S07), then it means the punch TP or the die TD is not attached to the correct position instructed by the setup information. Accordingly, in Step S15, the NC unit 10 executes predetermined warning processing.

The warning processing in Step S15 is, for example, processing for informing the operator that the punch TP or the die TD is not attached to the correct position instructed by the setup information, and advising the operator to correct the attachment position of the punch TP or the die TD so that the punch TP or the die TD can be located at the correct position instructed by the setup information. This is particularly effective for such a case where the operator performs Step S05.

The operator corrects the position of the punch TP or the die TD according to needs.

In a similar way to Step S12, in Step S16, the NC unit 10 determines whether or not there is an instruction to continue the work. If the instruction to continue the work is issued by the fact that the button of "continue" is operated (YES in Step S16), then in Step S17, the NC unit 10 determines whether or not the bending processing is possible.

In a case of having determined that the bending processing is possible (YES in Step S17), the NC unit 10 recalculates the setup, and updates the setup information in Step S18. When the setup information is updated, the NC unit 10 transfers the processing to Step S08 described above.

If the instruction to discontinue the work is issued (NO in Step S16), or if it is not determined that the bending processing is possible (No in Step S17), the NC unit 10 ends the processing.

As understood from FIG. 19, in this embodiment, before the punch TP and the die TD are clamped in Step S09, it is determined whether or not the punch TP or the die TD is attached to the correct position instructed by the setup information. The punch TP and the die TD are not clamped by the clampers, and accordingly, the attachment position of each thereof is easily correctable unless the punch TP or the die TD is attached to the correct position.

Figure 20:
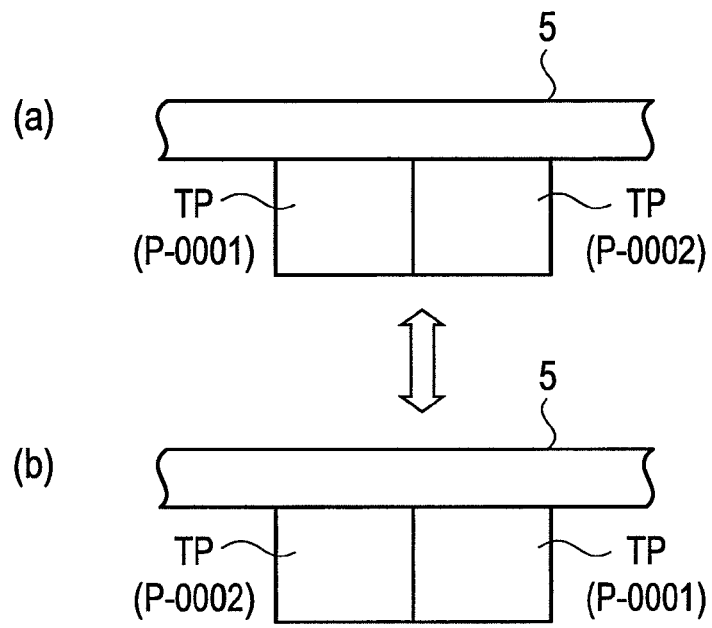
FIG. 20 is a plan view showing a first example where punches instructed by the setup information and punches actually attached are equivalent to each other.
Figure 21:
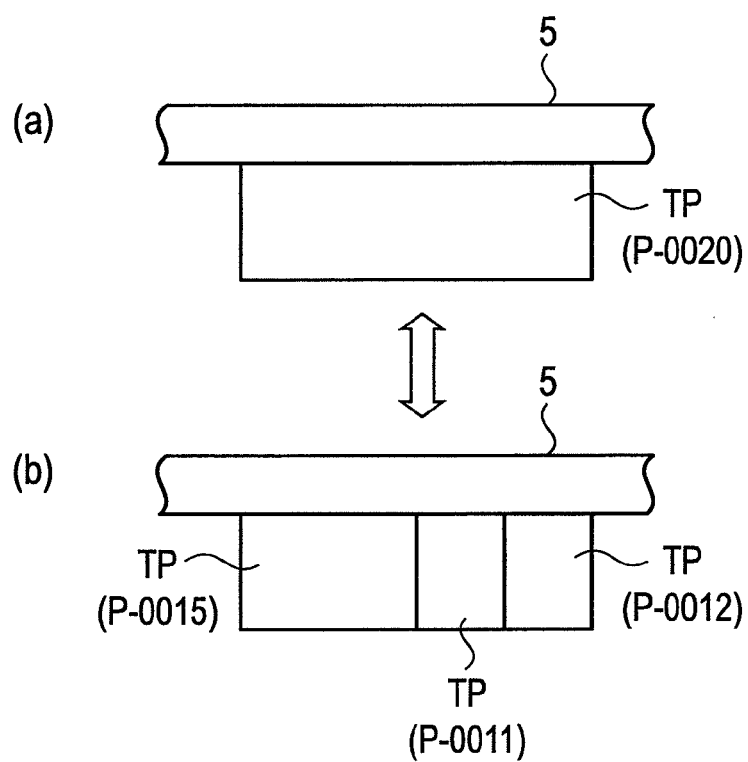
FIG. 21 is a plan view showing a second example where a punch instructed by the setup information and punches actually attached are equivalent to each other.

By using FIG. 20 and FIG. 21, a description is made of an example where it is determined that the bending processing is possible in Step S13 described above and the setup information is updated in Step S14. Here, it is assumed that, with regard to the identification information shown by the two-dimensional code Ctd, one piece of the identification information is assigned to each of the tools, and the individual tools are identifiable even if the tools are of the same type.

(a) of FIG. 20 shows punches TP instructed by the setup information. The setup information issues an instruction to attach a punch TP, which has "P-0001" as an identification number, on the left side, and to attach a punch TP, which has "P-0002" as an identification number, on the right side. These two punches TP are the same type of punches TP.

As shown in (b) of FIG. 20, it is possible to exchange right and left positions of the punch TP, which has "P-0001" as the identification number, and of the punch TP, which has "P-0002" as the identification number. In such a case, it is determined that the bending processing is possible in Step S13 described above.

(a) of FIG. 21 shows a punch TP instructed by the setup information. The setup information issues an instruction to attach a punch TP, which has "P-0020" as an identification number.

In a punch TP, which has "P-0015" as an identification number, a punch TP, which has "P-0011" as an identification number, and a punch TP, which has "P-0012" as an identification number, these three punches TP being shown in (b) of FIG. 21, shapes of tip ends P00 thereof are the same as that of the punch TP, which has "P-0020" as the identification number, and only widths thereof are different from that of the punch TP, which has "P-0020" as the identification number.

The bending processing is possible even if the three punches TP, which have "P-0011", "P-0012" and "P-0015" as the identification numbers, are combined with one another in place of the punch TP, which has "P-0020" as the identification number. In such a case, it is determined that the bending processing is possible in Step S13 described above.

In the flowchart shown in FIG. 19, in the event where the punches TP or the dies TD are attached onto the upper tool holder 5 or the lower tool holder 6 one by one, the two-dimensional codes Ctd are read, and the attachment positions of the punches TP or the dies Td are detected one by one.

Figure 22:
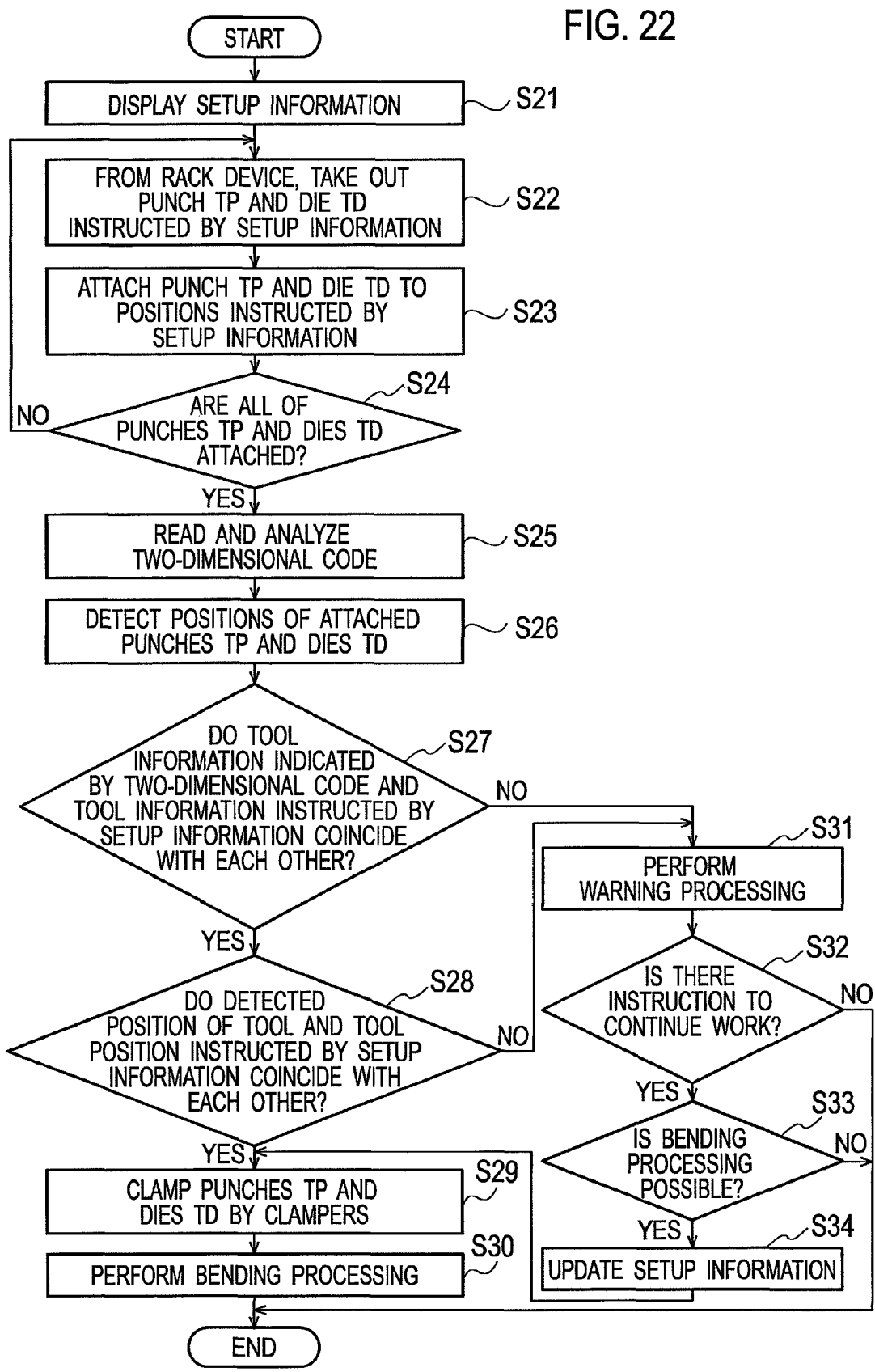
FIG. 22 is a flowchart for explaining a second operation example of the bending device of the first embodiment.

As shown in FIG. 22, after all of the punches TP and the dies TD are attached onto the upper tool holder 5 and the lower tool holder 6, respectively, the two-dimensional codes Ctd may be read, and the attachment positions may be detected.

Steps S21, S22, S23 and S24 in FIG. 22 are substantially the same as Steps S01, S02, S05 and S08. In FIG. 22, all of the punches TP and the dies TD are attached onto the upper tool holder 5 and the lower tool holder 6, respectively, then it is determined that all of the punches TP and the dies TD are attached (YES in Step S24).

In Step S25, the NC unit 10 analyzes the individual two-dimensional codes Ctd of all of the punches TP and the dies TD, which are read by the two-dimensional code reader 9. In Step S26, the NC unit 10 allows the tool position detection device of the above-mentioned embodiment to detect the individual positions of all of the punches TP and the dies TD. Such an order of Step S5 and Step S26 may be inverted.

In Step S27, the NC unit 10 collates the tool information, which is indicated by each of the two-dimensional codes Ctd, and the tool information of each of the punches TP and the dies TD, which is instructed by the setup information, with each other, and determines whether or not both pieces of the tool information coincide with each other.

In a case where both pieces of the tool information coincide with each other (YES in Step S27), then in Step S28, the NC unit 10 determines whether or not each position of the punches TP and the dies TD, which is detected by the tool position detection unit 11, and the position instructed by the setup information coincide with each other.

In a case where both pieces of the tool information coincide with each other (YES in Step S28), then in Step S29, the punches TP and the dies TD are clamped by the clampers. When the operator operates the operation/display panel 8 to issue the instruction to start the bending processing, then in Step S30, the NC unit 10 executes the bending processing, and then ends the same.

Meanwhile, in a case where both pieces of the tool information do not coincide with each other in at least a part (NO in Step S27), and in a case where the positions do not coincide with each other at least a part (NO in Step S28), then in Step S31, the NC unit 10 executes similar warning processing to those of Steps S11 and S15 of FIG. 19.

The operator takes out the correct punch TP or die TD from the rack device according to needs, and allows the two-dimensional code reader 9 to read the two-dimensional code Ctd. Moreover, the operator corrects the position of the punch TP or the die TD according to needs.

In Step S32, the NC unit 10 determines whether or not there is an instruction to continue the work. If the instruction to continue the work is issued (YES in Step S32), then in Step S33, the NC unit 10 determines whether or not the bending processing is possible. In a case of having determined that the bending processing is possible (YES in Step S33), the NC unit 10 recalculates the setup, and updates the setup information in Step S34.

When the setup information is updated, the NC unit 10 transfers the processing to Step S29 described above.

If the instruction to discontinue the work is issued (NO in Step S32), or if it is not determined that the bending processing is possible (No in Step S33), the NC unit 10 ends the processing.

Also in FIG. 22, before the punch TP and the die TD are clamped in Step S29, it is determined whether or not the punches TP and the dies TD are attached to the correct positions instructed by the setup information. The punches TP and the dies TD are not clamped by the clampers, and accordingly, the attachment position of each thereof is easily correctable unless the punches TP and the dies TD are attached to the correct positions.

Incidentally, in a case where the robot performs all of a series of the operations of taking out the punches TP and the dies TD from the rack device, attaching the punches TP and the dies TD onto the upper tool holder 5 and the lower tool holder 6, respectively, and bending the plate material, then it is possible that erroneous selection of the punches TP and the dies TD and attachment of the punches TP and the dies TD to erroneous positions may bring about a failure of the bending device. By the processing of FIG. 19 and FIG. 22, the failure of the bending device can also be prevented.

The tool position detection device of the embodiment described above has advantages as follows. As mentioned above, the punches TP and the dies TD, which are attached onto the upper tool holder 5 and the lower tool holder 6, are fixed by the clampers. The tool position detection device of the one embodiment detects the positions of the tools in a state where the holder-oriented power feeding electrodes 31 and the tool-oriented power receiving electrodes T31 are not in contact with each other, and in a state where the holder-oriented detection electrodes 32 and the tool-oriented displacement electrodes T32 are not in contact with each other.

That is to say, in accordance with the tool position detection device of the one embodiment, the positions of the punches TP and the dies TD are detected instantaneously before the punches TP and the dies TD are attached onto the upper tool holder 5 and the lower tool holder 6 and are fixed to the clampers. In the case where it is necessary to correct the attachment positions, the tools are not fixed by the clampers, and accordingly, it is possible to correct the attachment positions easily.

Moreover, the positions of the punches TP and the dies TD before the fixation thereof by the clampers and the positions of the punches TP and the dies TD after the fixation thereof by the clampers are compared with each other, whereby it is also possible to detect minute positional shifts of the punches TP and the dies TD in the event where the punches TP and the dies TD are fixed by the clampers.

Hence, it can be said that the tool position detection device of the one embodiment, which is capable of detecting the positions of the tools in the state where the holder-oriented power feeding electrodes 31 and the tool-oriented power receiving electrodes T31 are not in contact with each other and in the state where the holder-oriented detection electrodes 32 and the tool-oriented displacement electrodes T32 are not in contact with each other, employs an extremely preferable detection method. Since the configuration is simple, the one embodiment is preferable also in that a cost increase can be suppressed to the minimum.

<Second Embodiment of Bending Device>

As the bending device, there are: a type (modular type) in which the upper tool holder 5 is integrally attached to the lower end portion of the upper table 2 across the overall length thereof like the bending device 100 of the first embodiment, which is shown in FIG. 1; and a type (adapter plate type) in which the upper tool holder 5 is attached onto the lower end portion of the upper table 2 in a manner of being divided in the longitudinal direction of the lower end portion.

Figure 23:
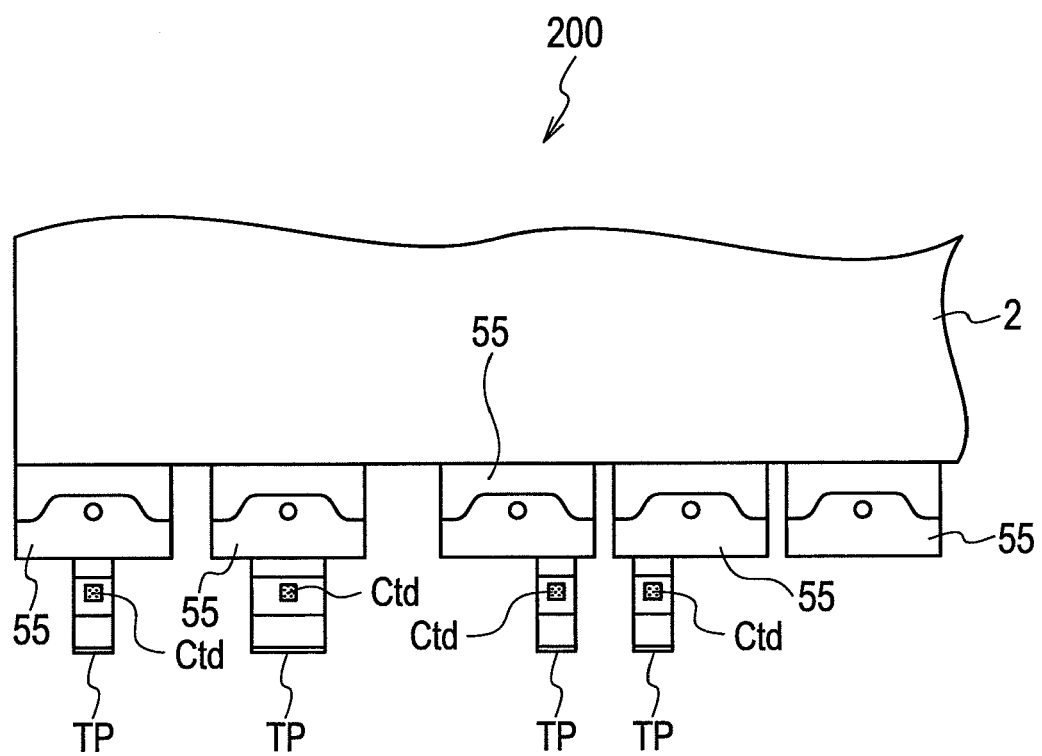
FIG. 23 is a partial plan view of a second embodiment device using adapter plates.

A bending device 200 of a second embodiment, which is shown in FIG. 23, is an embodiment in a case of the bending device of the adapter plate type. FIG. 23 shows only a part of the upper table 2 side. The bending device 100 of the first embodiment and the bending device 200 of the second embodiment have substantially the same configuration except for a different point whether or not the adapter plate is used. Hence, with regard to portions of the bending device 200, which are common to those of the bending device 100, illustration and description thereof are omitted.

In FIG. 23, a plurality of adapter plates 55 is attached onto the upper table 2 through clamp jaws (not shown). Attachment positions of the adapter plates 55 with respect to the longitudinal direction (right-and-left direction of FIG. 23) of the upper table 2 are adjustable. The attachment positions of the adapter plates 55 are appropriately set in response to the plate material to be bent and in response to a bending method for the plate material. The punches TP are attached onto a part of the adapter plates 55. Onto which adapter plates 55 the punches TP should be attached and to which positions of the adapter plates 55 the punches TP should be attached are appropriately set in response to the plate material to be bent and in response to the bending method for the plate material.

The bending device 200 of the second embodiment mounts the tool position detection device of the one embodiment thereon. That is to say, in a similar way to the holder-oriented power feeding electrode 31 described with reference to FIG. 4, each of the adapter plate 55 includes, on an inner wall thereof, a power feeding electrode having the same length as a length of a longitudinal direction of the adapter plate 55. In a similar way to the holder-oriented detection electrodes 32 described with reference to FIG. 4, each of the adapter plates 55 includes a plurality of detection electrodes, which are insulated from the power feeding electrode, and are arrayed in a longitudinal direction of the power feeding electrode. Each of the adapter plates 55 includes a circuit similar to that of the voltage information extractor 330 described with reference to FIG. 4.

Though not shown in FIG. 23, a lower tool holder 6 is attached onto an upper end portion of a lower table 3. In a similar way to the adapter plates 55, the lower tool holder 6 also includes a power feeding electrode and a plurality of detection electrodes.

In the bending device 200 of the second embodiment, by the position detection method of the tool position detection device of the above-mentioned one embodiment, to which positions of the adapter plates 55 attached onto the upper table 2 and of the lower tool holder 6 attached onto the lower table 3 the punches TP and the dies TD are individually attached is detected.

The adapter plates 55 attached onto the upper table 2 and the lower tool holder 6 attached onto the lower table 3 are another example of the tool attachment unit that attaches the punches TP or the dies TD thereonto.

<Rack Device>

The rack device that houses a plurality of punches TP and dies TD therein houses the plurality of punches TP in substantially the same upper tool holder as the upper tool holder 5 of the bending device 100, and houses the plurality of dies TD in substantially the same lower tool holder as the lower tool holder 6. Accordingly, it is also possible to mount the tool position detection device of the above-described one embodiment on the rack device.

Figure 24:
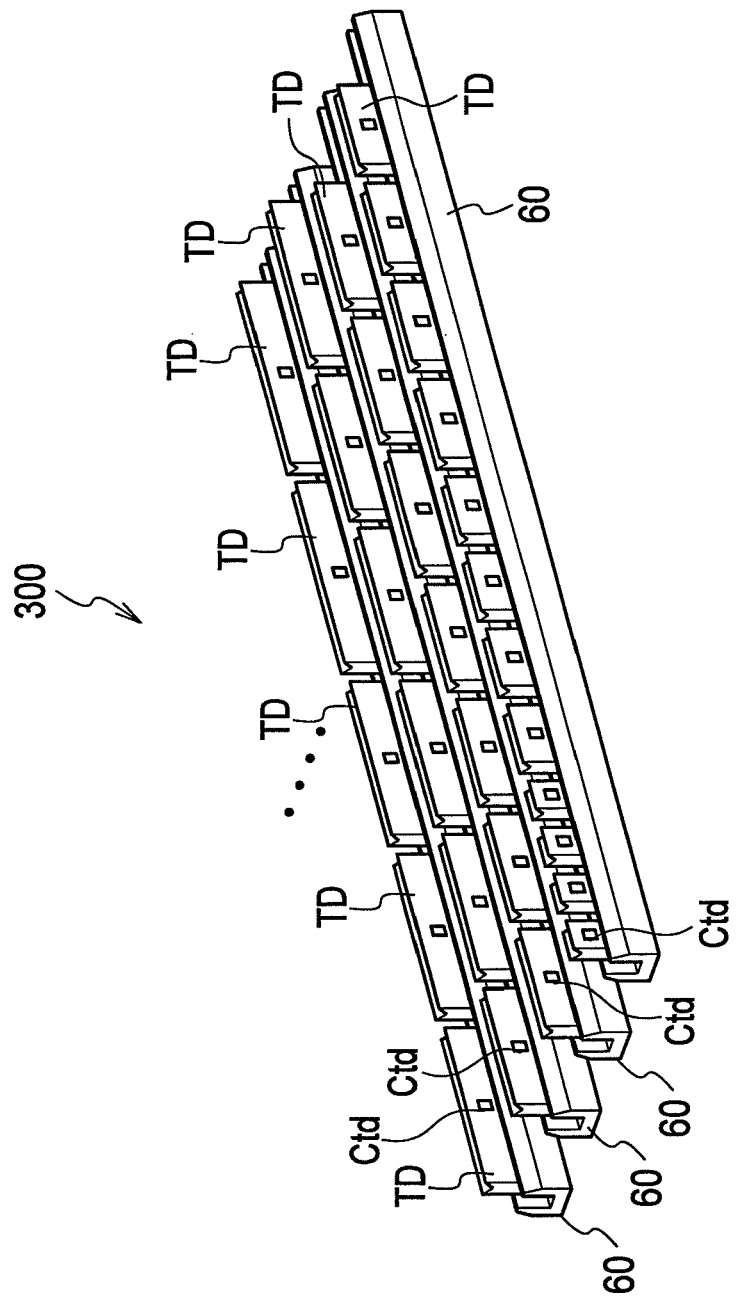
FIG. 24 is a partial perspective view showing an example of a rack device.

FIG. 24 shows a rack device 300 as one configuration example of the rack device. As shown in FIG. 24, the rack device 300 includes a plurality of the lower tool holders 60. Onto each of the lower tool holders 60, the plurality of dies TD is attached. In the event of bending the plate material by the bending device 100 or 200, the operator or the robot takes out the dies TD, which are for use in such bending processing, from the rack device 300. Moreover, after the end of the bending processing, the operator or the robot returns the used dies TD to the rack device 300.

Though not shown in FIG. 24, the rack device 300 includes a plurality of the upper tool holders, and onto each of the upper tool holders, the plurality of punches TP are attached. In the event of bending the plate material by the bending device 100 or 200, the operator or the robot (including the ATC) takes out the punches TP, which are for use in the bending processing, from the rack device 300. Moreover, after the end of the bending processing, the operator or the robot returns the used punches TP to the rack device 300.

The rack device 300 mounts the tool position detection device of the one embodiment thereon. In the rack device 300, by the position detection method by the tool position detection device of the above-mentioned one embodiment, to which positions of the upper tool holders (not shown) the punches TP are attached and to which positions of the lower tool holders 60 the dies TD are attached are detected.

The NC unit that controls the rack device 300 manages the types of the punches TP and the dies TD, which are attached onto the pluralities of upper tool holders and lower tool holders 60, respectively. In an event of returning the punches TP and the dies TD to the rack device 300, the two-dimensional codes Ctd thereof are read, and thereafter, the punches TP and the dies TD are returned to predetermined positions.

By the position detection method by the tool position detection device of the above-mentioned one embodiment, the rack device 300 can detect whether or not each of the pluralities of the punches TP and the dies TD is attached to a predetermined correct position of each of the upper tool holders or the lower tool holders 60.

If the rack device 300 attaches the punches TP and the dies TD to such predetermined correct positions of the upper tool holders and the lower tool holders 60, then, in the event of bending the plate material by the bending device 100 or 200, a selection error of the types of the punches TP and the dies TD can be prevented.

The upper tool holders and the lower tool holders 60 in the rack device 300 are still another example of the tool attachment unit that attaches the punches TP or the dies TD thereonto.

<Position Detection Method of Attachment Member with Respect to Attachment Target Device>

In the respective embodiments described above, the attachment positions of the tools when the tools are attached to the tool attachment unit are detected. The tool position detection device described with reference to FIG. 4 is also usable in cases of detecting attachment positions when tools other than the punches or dies, and further, arbitrary attachment members other than the tools are attached onto an arbitrary attachment target device. The attachment target device stands for a device onto which attachment members are attached.

Accordingly, a summary of the position detection method of the attachment member with respect to the attachment target device is carried out in a procedure as follows. The power feeding electrode is provided in the longitudinal direction of the attachment target device, and a plurality of detection electrodes, which are insulated from the power feeding electrode, is provided in line in the longitudinal direction of the attachment target device. On the attachment member, a power receiving electrode and a displacement electrode, which are connected to each other, are provided.

Step S101: When the attachment member is attached to any position in the longitudinal direction of the attachment target device, the power receiving electrode is opposed to the power feeding electrode in a non-contact state, and the displacement electrode is opposed to any of the plurality of detection electrodes in a non-contact state.

Step S102: A capacitor circuit, in which a capacity is changed in response to a position of the attachment member with respect to the longitudinal direction of the attachment target device, is formed of a pair of the power feeding electrode and the power receiving electrode, which are opposite to each other, and of a pair of the detection electrode and the displacement electrode, which are opposite to each other.

Step S103: An alternating current power feeding is supplied to the power feeding electrode.

Step S104: In a state where the power feeding signal is supplied to the power feeding electrode, voltage information, which is changed in response to the capacity of the capacitor circuit, is extracted from the detection electrode.

Step S105: Based on a position of the detection electrode among the plurality of detection electrodes, from which the voltage information is extracted, to which position in the longitudinal direction of the attachment target device the attachment member is attached is detected.

The present invention is not limited to the respective embodiments described above, and is modifiable in various ways within the scope without departing from the spirit of the present invention.

In this embodiment, the tool-oriented power receiving electrode T31 and the tool-oriented displacement electrode T32 are directly coupled to each other by the signal line as shown in FIG. 11; however, a connection method of connecting the tool-oriented power receiving electrode T31 and the tool-oriented displacement electrode T32 is not limited to FIG. 11. For example, a predetermined circuit, which does not affect the detection of the tool position, may be provided between the tool-oriented power receiving electrode T31 and the tool-oriented displacement electrode T32. The tool-oriented power receiving electrode T31 and the tool-oriented displacement electrode T32 may be indirectly connected to each other through such a predetermined circuit and the like.

INDUSTRIAL APPLICABILITY

The present invention is usable for the bending device and the rack device, in which the punch or the die is attached onto the tool attachment unit. Moreover, in the case of attaching another tool (other than the punch or the die) onto the attachment unit, the present invention is usable in the event of detecting the attachment position of the tool. Furthermore, the present invention is usable as the position detection method of the attachment member in the case of attaching the arbitrary attachment member to any position in the longitudinal direction of the arbitrary attachment target device.

The invention claimed is:

1. A tool position detection device comprising:
   a power feeding electrode provided on an inner wall of a tool attachment that attaches thereonto a tool having a power receiving electrode and a displacement electrode, the power feeding electrode being provided to be opposite to the power receiving electrode in a longitudinal direction of the tool attachment in a non-contact state;
   a plurality of detection electrodes provided on the inner wall to be opposite to the displacement electrode in a non-contact state, being insulated from the power feeding electrode, and being provided in line in the longitudinal direction of the tool attachment; and
   a power supply configured to supply an alternating current power feeding signal to the power feeding electrode,
   wherein, when the tool is attached onto the tool attachment, a pair of the power feeding electrode and the power receiving electrode, which are provided opposite to each other, and a pair of a detection electrode and the displacement electrode, which are provided opposite to each other, form a capacitor circuit,
   a capacity of the capacitor circuit is configured to be changed in response to a position of the tool with respect to the longitudinal direction of the tool attachment, and
   the tool position detection device further comprises:
   a voltage information extractor configured to extract voltage information from the detection electrode when the power feeding signal is supplied to the power feeding electrode by the power supply, the voltage information being changed in response to the capacity of the capacitor circuit; and
   a position detection/arithmetic operation unit configured to detect to which position in the longitudinal direction of the tool attachment the tool is attached based on the voltage information extracted by the voltage information extractor.

2. The tool position detection device according to claim 1, wherein the voltage information extractor includes an electrode switching circuit that alternatively selects and sequentially switches the detection electrodes, which are taken as extraction targets of the voltage information, from among the plurality of detection electrodes.

3. The tool position detection device according to claim 1, further comprising:
  an A/D converter configured to convert the voltage information, which is extracted by the voltage information extractor, into a digital signal,
  wherein the position detection/arithmetic operation unit detects to which position in the longitudinal direction of the tool attachment the tool is attached based on the voltage information converted into the digital signal by the A/D converter.

4. The tool position detection device according to claim 1, wherein the position detection/arithmetic operation unit detects the position of the tool by using two pieces of voltage information extracted from two adjacent detection electrodes among the plurality of detection electrodes by the voltage information extractor.

5. The tool position detection device according to claim 4, further comprising:
  a characteristic information holder configured to hold characteristic information indicated by the voltage information extracted by the voltage information extractor,
  wherein the position detection/arithmetic operation unit detects the position of the tool by using the characteristic information held by the characteristic information holder.

6. The tool position detection device according to claim 1, wherein the position detection/arithmetic operation unit detects the position of the tool by using a ratio of a maximum value of voltage information extracted by the voltage information extractor in a state where the displacement electrode and the detection electrode are provided opposite to each other to coincide with each other, and the voltage information extracted from the detection electrode by the voltage information extractor.

7. The tool position detection device according to claim 1, wherein a width of the displacement electrode is one fixed width irrespective of a width of the tool, and a width of the detection electrode is approximately a same width as the width of the displacement electrode.

8. The tool position detection device according to claim 1, wherein a maximum attachable number of the detection electrodes are provided when narrowest tools are attached onto the tool attachment.

9. The tool position detection device according to claim 1, wherein the power feeding electrode and the detection electrodes are individually covered with insulating films.

10. A bending device configured to bend a plate material by using a punch and a die, comprising:
  a first tool attachment that includes a first recessed portion housing an end portion of the punch therein, and configured to attach the punch thereonto; and
  a second tool attachment that includes a second recessed portion housing an end portion of the die therein, and configured to attach the die thereonto,
  wherein the punch and the die include power receiving electrodes and displacement electrodes, which are provided on the respective end portions thereof,
  the first and second tool attachments include:
  power feeding electrodes, which are provided in a longitudinal direction of sidewalls of the first and second recessed portions to be disposed opposite to the power receiving electrodes in a non-contact state when the punch and the die are attached onto the first and second tool attachments, respectively; and
  a plurality of detection electrodes provided in line in the longitudinal direction of the sidewalls of the first and second recessed portions in a state of being insulated from the power feeding electrodes, the detection electrodes being provided opposite to the displacement electrodes in a non-contact state when the punch and the die are attached onto the first and second tool attachments, respectively,
  when the punch or the die is attached onto the first or second recessed portion, a pair of a power feeding electrode and a power receiving electrode, which are provided opposite to each other, and a pair of a detection electrode and a displacement electrode, which are provided opposite to each other, form a capacitor circuit,
  a capacity of the capacitor circuit is configured to be changed in response to a position of the punch or the die with respect to the longitudinal direction of the first or second recessed portion, and
  the bending device further comprises:
  a power supply configured to supply a power feeding signal to the power feeding electrodes;
  a voltage information extractor configured to extract voltage information from each of the detection electrodes when the power feeding signal is supplied to the power feeding electrodes by the power supply, the voltage information being changed in response to the capacity of the capacitor circuit; and
  a position detection/arithmetic operation unit configured to detect to which position in the longitudinal direction of the first or second recessed portion the punch or the die is attached based on the voltage information extracted by the voltage information extractor, the voltage information coming from each of the plurality of detection electrodes.

11. The bending device according to claim 10,
  wherein the punch and the die include pieces of identification information, which individually specify the punch and the die, and
  the bending device further comprises a reader configured to read the pieces of the identification information.

12. The bending device according to claim 11,
  wherein each piece of the identification information is formed of a two-dimensional code, and
  the reader is a two-dimensional code reader configured to read the two-dimensional code.

13. The bending device according to claim 11, further comprising:
  an NC unit configured to collate the punch or the die, which is specified by the identification information read by the reader, and a punch or a die, which is instructed by setup information indicating a setup of bending the plate material, with each other, and determine whether or not the punch or the die, which is instructed by the setup information, is attached onto the first or second tool attachment.

14. The bending device according to claim 13, wherein the NC unit is configured to collate a position of the punch or the die, the position being detected by the position detection/arithmetic operation unit, and a position to which the punch or the die should be attached, the position being instructed by the setup information, with each other, and determine whether or not the punch or the die is attached to the position instructed by the setup information in the first or second tool attachment.

15. The bending device according to claim 10, wherein each of the power receiving electrodes and each of the displacement electrodes have one fixed width irrespective of a width of the punch and the die, and are formed on centers in a width direction of the punch and the die.

16. The bending device according to claim 15, wherein a width of each of the detection electrodes is approximately a same width as the width of each of the displacement electrodes.

17. The bending device according to claim 10, wherein the power receiving electrodes, the displacement electrodes, the power feeding electrodes and the detection electrodes are individually covered with insulating films.

18. The bending device according to claim 10, wherein the first and second tool attachments are tool holders individually attached onto an upper table and a lower table, or an adapter plate attached onto the upper table.

19. A position detection method of an attachment member with respect to an attachment target device, the position detection method comprising:

an attachment member having a power receiving electrode and a displacement electrode is attached to any position in a longitudinal direction of an attachment target device, providing the power receiving electrode to be opposite to a power feeding electrode in a non-contact state, the power feeding electrode being provided in the longitudinal direction of the attachment target device, and providing the displacement electrode to be opposite to any of a plurality of detection electrodes in a non-contact state, the detection electrodes being provided in line in the longitudinal direction of the attachment target device and being insulated from the power feeding electrode;

forming a capacitor circuit in which a capacity is changed in response to a position of the attachment member with respect to the longitudinal direction of the attachment target device, the capacitor circuit being formed of a pair of the power feeding electrode and the power receiving electrode, which are provided opposite to each other, and a pair of a detection electrode and the displacement electrode, which are provided opposite to each other;

supplying an alternating current power feeding signal to the power feeding electrode;

extracting voltage information from the detection electrode in a state where the power feeding signal is supplied to the power feeding electrode, the voltage information being changed in response to the capacity of the capacitor circuit; and detecting to which position in the longitudinal direction of the attachment target device the attachment member is attached based on a position of the detection electrode from which the voltage information is extracted among the plurality of detection electrodes.

20. The position detection method of an attachment member with respect to an attachment target device according to claim 19, wherein the position of the attachment member is detected by using two pieces of voltage information extracted from two adjacent detection electrodes among the plurality of detection electrodes.

21. The position detection method of an attachment member with respect to an attachment target device according to claim 20, wherein characteristics indicated by the voltage information changed depending on a relative positional relationship between the displacement electrode and the detection electrode are measured as characteristic information in advance, and the position of the attachment member is detected by using the characteristic information.

22. The position detection method of an attachment member with respect to an attachment target device according to claim 19, wherein the position of the attachment member is detected by using a ratio of a maximum value of voltage information extracted from the detection electrode in a state where the displacement electrode and the detection electrode are provided opposite to each other to coincide with each other, and of the voltage information extracted from the detection electrode.

* * * * *